US010299291B2

(12) United States Patent
Chen et al.

(10) Patent No.: US 10,299,291 B2
(45) Date of Patent: May 21, 2019

(54) IDENTIFICATION AND USE OF RESOURCE SETS ASSOCIATED WITH DIFFERENT RESTRICTION LEVELS FOR RESOURCE USAGE IN A RADIO FREQUENCY SPECTRUM BAND

(71) Applicant: QUALCOMM Incorporated, San Diego, CA (US)

(72) Inventors: Wanshi Chen, San Diego, CA (US); Juan Montojo, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 15/494,162

(22) Filed: Apr. 21, 2017

(65) Prior Publication Data

US 2017/0374680 A1    Dec. 28, 2017

Related U.S. Application Data

(60) Provisional application No. 62/355,187, filed on Jun. 27, 2016.

(51) Int. Cl.
*H04W 16/14* (2009.01)
*H04W 48/02* (2009.01)
*H04W 72/04* (2009.01)
*H04W 74/08* (2009.01)

(52) U.S. Cl.
CPC ....... *H04W 74/0808* (2013.01); *H04W 16/14* (2013.01); *H04W 72/04* (2013.01); *H04W 48/02* (2013.01)

(58) Field of Classification Search
None
See application file for complete search history.

(56) References Cited

U.S. PATENT DOCUMENTS

| 8,774,819 | B2 | 7/2014 | Zhang et al. |
| 8,917,640 | B2 | 12/2014 | Lee et al. |
| 9,030,942 | B2 | 5/2015 | Kim et al. |
| 9,113,396 | B2 | 8/2015 | Rune et al. |
| 2002/0186710 | A1 | 12/2002 | Alvesalo et al. |

(Continued)

OTHER PUBLICATIONS

ISA/EP, International Search Report and Written Opinion of the International Searching Authority, Int'l Application No. PCT/US2017/035260, dated Sep. 13, 2017, European Patent Office, Rijswijk, NL, 12 pgs.

*Primary Examiner* — Brian S Roberts
(74) *Attorney, Agent, or Firm* — Liem T. Do

(57) ABSTRACT

Techniques are described for wireless communication. One method includes identifying, by a first device, a first resource set, a second resource set, and a third resource set in a radio frequency spectrum band. The first resource set, the second resource set, and the third resource set are respectively associated with a first restriction level for resource usage, a second restriction level for resource usage, and a third restriction level for resource usage. The method also includes communicating with a second device using at least one resource set of the first resource set, the second resource set, or the third resource set. The at least one resource set is based at least in part on the first restriction level for resource usage, the second restriction level for resource usage, or the third restriction level for resource usage.

93 Claims, 17 Drawing Sheets

(56) References Cited

U.S. PATENT DOCUMENTS

| | | |
|---|---|---|
| 2006/0063533 A1 | 3/2006 | Matoba et al. |
| 2009/0190566 A1 | 7/2009 | Kwon et al. |
| 2010/0285824 A1 | 11/2010 | Karaoguz et al. |
| 2011/0009145 A1* | 1/2011 | Pirinen ................ H04W 16/14 |
| | | 455/509 |
| 2013/0070688 A1 | 3/2013 | Picker |
| 2016/0036578 A1* | 2/2016 | Malladi ................ H04L 5/0057 |
| | | 370/329 |
| 2016/0128084 A1* | 5/2016 | Novlan ............ H04W 72/1268 |
| | | 370/329 |
| 2016/0142192 A1* | 5/2016 | Damnjanovic ... H04W 74/0816 |
| | | 370/329 |
| 2016/0143014 A1* | 5/2016 | Mukherjee ........ H04W 74/0816 |
| | | 370/330 |
| 2016/0330765 A1 | 11/2016 | Levy et al. |
| 2017/0290059 A1* | 10/2017 | Karaki ............. H04W 74/0816 |

\* cited by examiner

IDENTIFICATION AND USE OF RESOURCE SETS ASSOCIATED WITH DIFFERENT RESTRICTION LEVELS FOR RESOURCE USAGE IN A RADIO FREQUENCY SPECTRUM BAND

CROSS REFERENCES

The present application for patent claims priority to U.S. Provisional Patent Application No. 62/355,187 by CHEN, et al., entitled "Identification and Use of Resource Sets Associated With Different Restriction Levels For Resource Usage in a Radio Frequency Spectrum Band," filed Jun. 27, 2016, assigned to the assignee hereof, and which is hereby expressly incorporated by reference herein in its entirety.

BACKGROUND

Field of the Disclosure

The present disclosure, for example, relates to wireless communication systems, and more particularly to the identification and use of resource sets associated with different restriction levels for resource usage in a radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations (or other network access devices), each simultaneously supporting communication for multiple communication devices, otherwise known as user equipment (UEs). A base station may communicate with UEs on downlinks (e.g., for transmissions from base stations to UEs) and uplinks (e.g., for transmissions from UEs to base stations).

Some modes of communication may enable communication between a base station and a UE over a radio frequency spectrum band shared by the devices of multiple operators, or over different radio frequency spectrum bands (e.g., a licensed radio frequency spectrum band and an unlicensed radio frequency spectrum band, or a dedicated radio frequency spectrum band and a shared radio frequency spectrum band). With increasing data traffic in cellular networks that use a licensed radio frequency spectrum band, the offloading of at least some data traffic to an unlicensed radio frequency spectrum band may provide a mobile network operator with opportunities for enhanced data transmission capacity. An unlicensed radio frequency spectrum band may also provide service in areas where access to a licensed radio frequency spectrum band is unavailable. However, access to an unlicensed radio frequency spectrum band or other type of shared radio frequency spectrum band may be based at least in part on contention, which in some cases may provide unfair access to some devices and/or a lower than desired quality of service (QoS).

SUMMARY

Techniques are described for identifying and using resource sets associated with different restriction levels for resource usage in a radio frequency spectrum band. In some examples, the techniques may be based at least in part on associations between resource sets and restriction levels for resource usage within the resource sets. For example, a first resource set, a second resource set, and a third resource set may be respectively associated with a first restriction level for resource usage, a second restriction level for resource usage, and a third restriction level for resource usage. In some examples, the first restriction level for resource usage may include an exclusive resource usage by a first set of devices (e.g., the devices associated with a first operator), such that the first set of devices may obtain access to the first resource set more reliably and/or achieve a higher QoS when using the first resource set. In some examples, the second restriction level for resource usage may include an exclusive resource usage by a second set of devices (e.g., the devices associated with a second operator), such that the second set of devices may obtain access to the second resource set more reliably and/or achieve a higher QoS when using the second resource set. In some examples, the third restriction level for resource usage may include a contention-based resource usage that enables devices associated with the first set of devices or the second sets of devices (e.g., devices associated with the first operator or the second operator) to contend for access to resources of the third resource set. The devices associated with the first set of devices and the devices associated with the second set of devices may be provided equal or unequal access to the resources of the third resource set.

In one example, a method for wireless communication is described. The method may include identifying, by a first device, a first resource set, a second resource set, and a third resource set in a radio frequency spectrum band. The first resource set, the second resource set, and the third resource set may be respectively associated with a first restriction level for resource usage, a second restriction level for resource usage, and a third restriction level for resource usage. The method may also include communicating with a second device using at least one resource set of the first resource set, the second resource set, or the third resource set. The at least one resource set may be based at least in part on the first restriction level for resource usage, the second restriction level for resource usage, or the third restriction level for resource usage.

In one example, an apparatus for wireless communication is described. The apparatus may include means for identifying, by a first device, a first resource set, a second resource set, and a third resource set in a radio frequency spectrum band. The first resource set, the second resource set, and the third resource set may be respectively associated with a first restriction level for resource usage, a second restriction level for resource usage, and a third restriction level for resource usage. The apparatus may also include means for communicating with a second device using at least one resource set of the first resource set, the second resource set, or the third resource set. The at least one resource set may be based at least in part on the first restriction level for resource usage, the second restriction level for resource usage, or the third restriction level for resource usage.

In one example, another apparatus for wireless communication is described. The apparatus may include a processor, memory in electronic communication with the processor, and instructions stored in the memory that are executable by the processor. The processor may be configured to execute instructions to identify, at a first device, a first resource set, a second resource set, and a third resource set in a radio frequency spectrum band. The first resource set, the second resource set, and the third resource set may be respectively associated with a first restriction level for resource usage, a second restriction level for resource usage, and a third restriction level for resource usage. The processor may also be configured to communicate with a second device using at least one resource set of the first resource set, the second resource set, or the third resource set. The at least one resource set may be based at least in part on the first restriction level for resource usage, the second restriction level for resource usage, or the third restriction level for resource usage.

In one example, a non-transitory computer-readable medium storing code for wireless communication is described, the code comprising instructions executable by a processor. The instructions may include instructions to identify, at a first device, a first resource set, a second resource set, and a third resource set in a radio frequency spectrum band. The first resource set, the second resource set, and the third resource set may be respectively associated with a first restriction level for resource usage, a second restriction level for resource usage, and a third restriction level for resource usage. The instructions may also include instructions to communicate with a second device using at least one resource set of the first resource set, the second resource set, or the third resource set. The at least one resource set may be based at least in part on the first restriction level for resource usage, the second restriction level for resource usage, or the third restriction level for resource usage.

In some examples of the method, apparatus, and computer-readable medium described above, the radio frequency spectrum band may be shared by devices associated with a first operator and devices associated with a second operator. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the contention-based resource usage by the second set of devices may include one or more thresholds for determining whether resources in the third resource set are cleared for usage by the second set of devices. In some examples, the first device may be associated with a first operator, and the second restriction level for resources usage may include a prohibition of resource usage by devices associated with the first operator and an exclusive resource usage by devices associated with a second operator.

Some examples of the method, apparatus, and computer-readable medium described above may further include processes, features, means, or instructions for selecting the at least one resource set for communicating with the second device from the first resource set, the second resource set, or the third resource set. In some examples, the at least one resource set for communicating with the second device may be selected based at least in part on: an operator associated with the first device, a characteristic of the communication, or a combination thereof. In some examples, the characteristic of the communication may be based at least in part on: the communication being associated with a quality of service (QoS) satisfying a threshold QoS, the communication including a type of control communication, the communication including a type of signaling, the communication including a type of synchronization signal, the communication being a broadcast communication type, the communication being associated with time tracking, the communication being associated with frequency tracking, the communication being associated with measurement or discovery of cells, or a combination thereof.

In some examples of the method, apparatus, and computer-readable medium described above, each of the first resource set, the second resource set, and the third resource set may be associated with at least one of: uplink use, downlink use, or a combination thereof.

Some examples of the method, apparatus, and computer-readable medium described above may further include processes, features, means, or instructions for receiving an indication of resources associated with at least one of: the first resource set, the second resource set, the third resource set, or a combination thereof.

Some examples of the method, apparatus, and computer-readable medium described above may further include processes, features, means, or instructions for identifying a first listen before talk (LBT) procedure to be performed by devices associated with a first operator before accessing the third resource set, and identifying a second LBT procedure to be performed by devices associated with a second operator before accessing the third resource set. The first LBT procedure and the second LBT procedure may provide different contention for access thresholds.

In some examples of the method, apparatus, and computer-readable medium described above, the first resource set, the second resource set, and the third resource set may be identified based at least in part on: TDM, FDM, SDM, or a combination thereof.

Some examples of the method, apparatus, and computer-readable medium described above may further include processes, features, means, or instructions for determining a first partition of resources for the first resource set, the second resource set, and the third resource set at a first time instance, and determining a second partition of resources for the first resource set, the second resource set, and the third resource set at a second time instance.

In some examples of the method, apparatus, and computer-readable medium described above, the first resource set, the second resource set, and the third resource set may be identified based at least in part on: a wired communication link, a wireless communication link, or a combination thereof.

Some examples of the method, apparatus, and computer-readable medium described above may further include processes, features, means, or instructions for operating at least one aspect of the first resource set and the third resource set jointly. The at least one jointly operated aspect of the first resource set and the third resource set may include: a hybrid automatic repeat request (HARQ) process, a power control parameter, or a combination thereof.

Some examples of the method, apparatus, and computer-readable medium described above may further include processes, features, means, or instructions for operating at least one aspect of the first resource set and the third resource set separately. The at least one separately operated aspect of the first resource set and the third resource set may include a HARQ process, a power control parameter, or a combination thereof.

In one example, another method for wireless communication is described. the method may include identifying, by a first device, a first resource set, a second resource set, and a third resource set in a radio frequency spectrum band. The first resource set, the second resource set, and the third resource set may be respectively associated with a first restriction level for resource usage, a second restriction level for resource usage, and a third restriction level for resource usage. The method may also include transmitting an indication of at least one resource set of the first resource set, the second resource set, or the third resource set to a second device.

In one example, another apparatus for wireless communication is described. The apparatus may include means for identifying, by a first device, a first resource set, a second resource set, and a third resource set in a radio frequency spectrum band. The first resource set, the second resource set, and the third resource set may be respectively associated with a first restriction level for resource usage, a second restriction level for resource usage, and a third restriction level for resource usage. The apparatus may also include means for transmitting an indication of at least one resource set of the first resource set, the second resource set, or the third resource set to a second device.

In one example, another apparatus for wireless communication is described. The apparatus may include a processor, memory in electronic communication with the processor, and instructions stored in the memory that are executable by the processor. The processor may be configured to execute instructions to identify, by a first device, a first resource set, a second resource set, and a third resource set in a radio frequency spectrum band. The first resource set, the second resource set, and the third resource set may be respectively associated with a first restriction level for resource usage, a second restriction level for resource usage, and a third restriction level for resource usage. The processor may also be configured to transmit an indication of at least one resource set of the first resource set, the second resource set, or the third resource set to a second device.

In one example, another non-transitory computer-readable medium storing code for wireless communication, the code comprising instructions executable by a processor is described. The instructions may include instructions to identify, by a first device, a first resource set, a second resource set, and a third resource set in a radio frequency spectrum band. The first resource set, the second resource set, and the third resource set may be respectively associated with a first restriction level for resource usage, a second restriction level for resource usage, and a third restriction level for resource usage. The instructions may also include instructions to transmit an indication of at least one resource set of the first resource set, the second resource set, or the third resource set to a second device.

In some examples of the method, apparatus, and computer-readable medium described above, the radio frequency spectrum band may be shared by devices associated with a first operator and devices associated with a second operator. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the contention-based resource usage by the second set of devices may include one or more thresholds for determining whether resources in the third resource set are cleared for usage by the second set of devices. In some examples, the first device may be associated with a first operator, and the second restriction level for resources usage may include a prohibition of resource usage by devices associated with the first operator and an exclusive resource usage by devices associated with a second operator.

In some examples of the method, apparatus, and computer-readable medium described above, identifying the first resource set, the second resource set, and the third resource set may include associating each of the first resource set, the second resource set, and the third resource set with at least one of: uplink use, downlink use, or a combination thereof.

Some examples of the method, apparatus, and computer-readable medium described above may further include processes, features, means, or instructions for defining a first LBT procedure to be performed by devices associated with a first operator before accessing the third resource set, and defining a second LBT procedure to be performed by devices associated with a second operator before accessing the third resource set. The first LBT procedure and the second LBT procedure may provide different contention for access thresholds.

In some examples of the method, apparatus, and computer-readable medium described above, identifying the first resource set, the second resource set, and the third resource set may include defining the first resource set, the second resource set, and the third resource set based at least in part on: TDM, FDM, SDM, or a combination thereof.

Some examples of the method, apparatus, and computer-readable medium described above may further include processes, features, means, or instructions for defining a first partition of resources for the first resource set, the second resource set, and the third resource set at a first time instance, and defining a second partition of resources for the first resource set, the second resource set, and the third resource set at a second time instance.

In some examples of the method, apparatus, and computer-readable medium described above, the first resource set, the second resource set, and the third resource set may be identified based at least in part on: a wired communication link, a wireless communication link, or a combination thereof.

Some examples of the method, apparatus, and computer-readable medium described above may further include processes, features, means, or instructions for operating at least one aspect of the first resource set and the third resource set jointly. The at least one jointly operated aspect of the first resource set and the third resource set may include: a HARQ process, a power control parameter, or a combination thereof.

Some examples of the method, apparatus, and computer-readable medium described above may further include processes, features, means, or instructions for operating at least one aspect of the first resource set and the third resource set separately. The at least one separately operated aspect of the first resource set and the third resource set may include a HARQ process, a power control parameter, or a combination thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which a shared radio frequency spectrum band is used for at least a portion of communications in a wireless communication system. In some examples, the shared radio frequency spectrum band may be used for Long Term Evolution (LTE) or LTE-Advanced (LTE-A) communications. The shared radio frequency spectrum band may be used in combination with, or independent from, a dedicated radio frequency spectrum band. The techniques may be based at least in part on associations between resource sets and restriction levels for resource usage within the resource sets.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
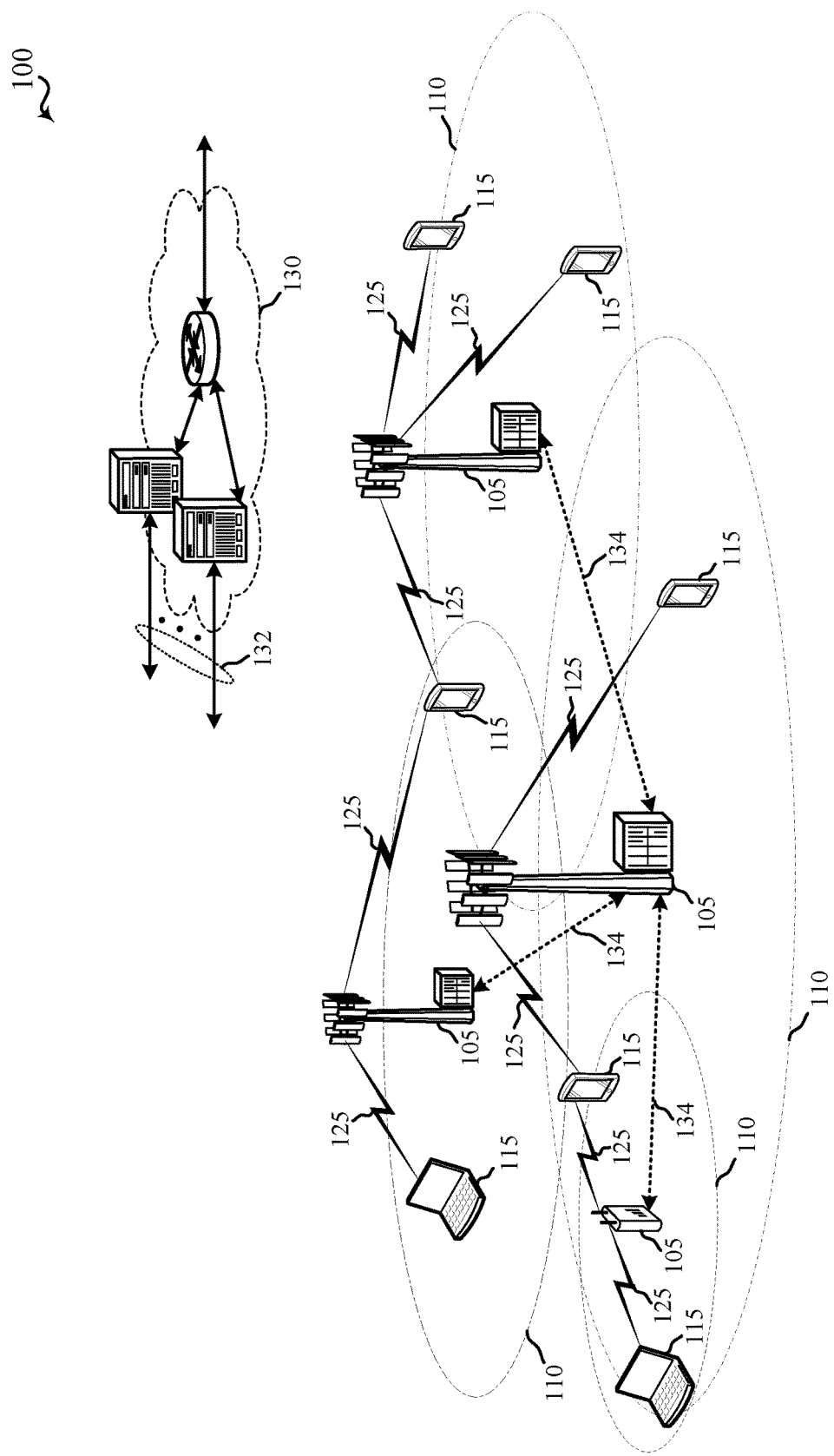
FIG. 1 shows an example of a wireless communication system, in accordance with various aspects of the present disclosure.

FIG. 1 shows an example of a wireless communication system 100, in accordance with various aspects of the present disclosure. The wireless communication system 100 may include base stations 105 (or other network access devices), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., Si, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, a base station 105 may be referred to as a base transceiver station, a radio base station, an access point, a radio transceiver, a (smart) radio head, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro cell or small cell base stations). There may be overlapping geographic coverage areas 110 for different radio access technologies supported by the base stations 105.

In some examples, the wireless communication system 100 may include an LTE/LTE-A network. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlinks (DLs), supporting transmissions from base stations 105 to UEs 115, or uplinks (ULs), supporting transmissions from UEs 115 to base stations 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to 32 CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a licensed radio frequency spectrum band or an unlicensed radio frequency spectrum band. The wireless communication system 100 may also support operation over a dedicated radio frequency spectrum band (e.g., a radio frequency spectrum band dedicated for use by the devices of one operator (e.g., one mobile network operator (MNO)) or a shared radio frequency spectrum band (e.g., a radio frequency spectrum band shared by the devices of more than one operator). A licensed radio frequency spectrum band may be a dedicated radio frequency spectrum band or a shared radio frequency spectrum band. An unlicensed radio frequency spectrum band will always be a shared radio frequency spectrum band. In a shared radio frequency spectrum band, the sharing of resources by multiple operators may be equal or unequal. Unequal sharing may be desirable, for example, when different operators have paid different fees to access a shared radio frequency spectrum band, or when one operator is a dominant or incumbent operator.

Figure 2:
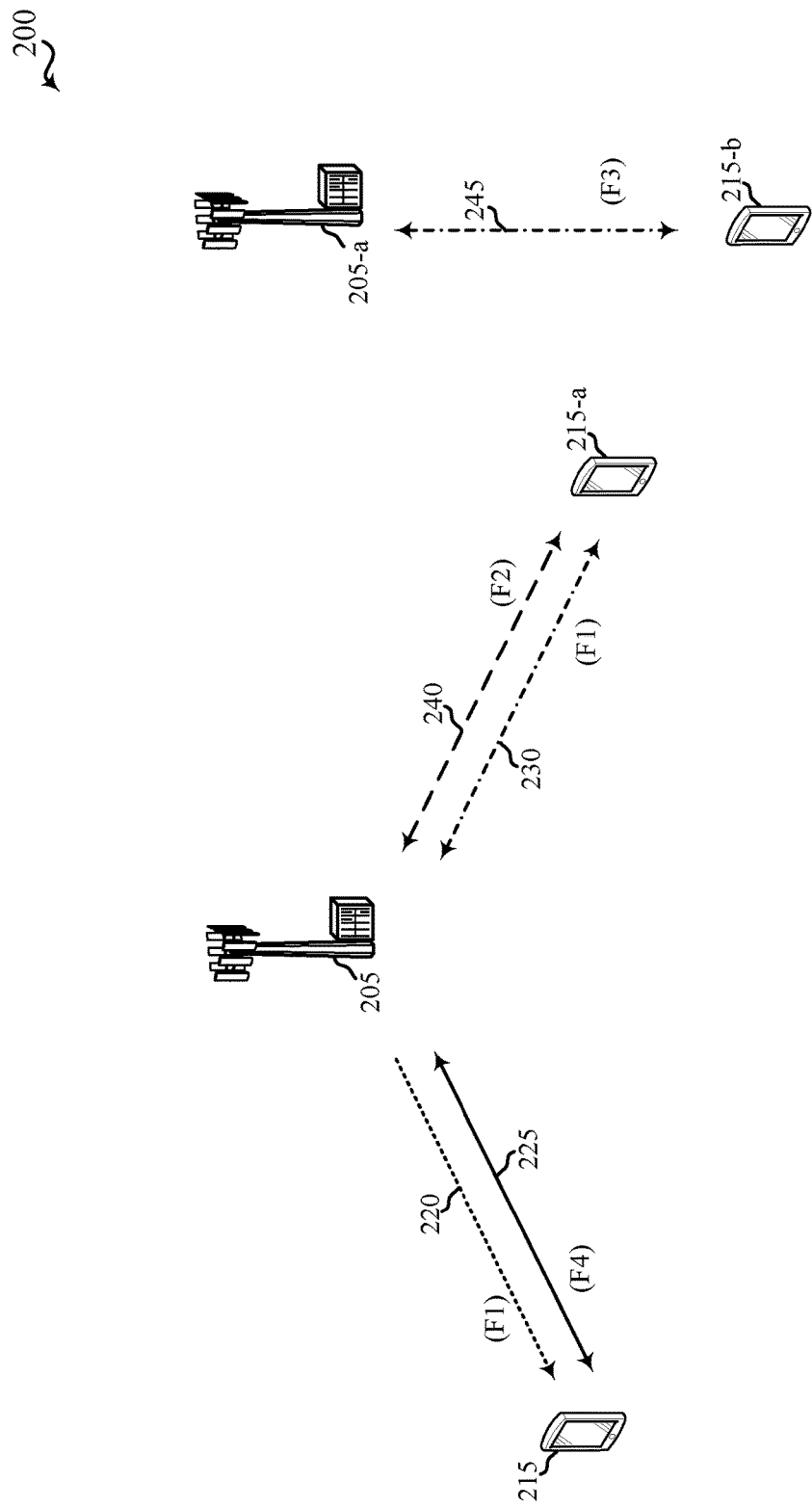
FIG. 2 shows a wireless communication system in which LTE/LTE-A may be deployed under different scenarios using an unlicensed radio frequency spectrum band (e.g., a type of shared radio frequency spectrum band), in accordance with various aspects of the present disclosure.

FIG. 2 shows a wireless communication system 200 in which LTE/LTE-A may be deployed under different scenarios using an unlicensed radio frequency spectrum band (e.g., a type of shared radio frequency spectrum band), in accordance with various aspects of the present disclosure. More specifically, FIG. 2 illustrates examples of a supplemental downlink mode (also referred to as a first licensed assisted access mode), a carrier aggregation mode (also referred to as a second licensed assisted access mode), and a standalone mode, in which LTE/LTE-A is deployed using an unlicensed radio frequency spectrum band. The wireless communication system 200 may be an example of portions of the wireless communication system 100 as described with reference to FIG. 1. Moreover, a first base station 205 and a second base station 205-a may be examples of aspects of one or more of the base stations 105 as described with reference to FIG. 1, while a first UE 215, a second UE 215-a, and a third UE 215-b may be examples of aspects of one or more of the UEs 115 as described with reference to FIG. 1.

In the example of the supplemental downlink mode (e.g., the first licensed assisted access mode) in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any operator (e.g., a MNO) that uses a licensed radio frequency spectrum band configured to relieve traffic or signaling congestion from the licensed radio frequency spectrum band.

In the example of the carrier aggregation mode (e.g., the second licensed assisted access mode) in the wireless communication system 200, the base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 240 and may receive SC-FDMA waveforms from the second UE 215-a using the third bidirectional link 240. The third bidirectional link 240 may be associated with a frequency F2 in a licensed radio frequency spectrum band. The third bidirectional link 240 may provide a downlink and uplink capacity offload for the first base station 205. Like the supplemental downlink mode (e.g., the first licensed assisted access mode) described above, this scenario may occur with an operator (e.g., MNO) that uses a licensed radio frequency spectrum band configured to relieve traffic or signaling congestion from the licensed radio frequency spectrum band.

As described above, one type of operator that may benefit from the capacity offload offered by using LTE/LTE-A in an unlicensed radio frequency spectrum band is a traditional MNO having access rights to an LTE/LTE-A licensed radio frequency spectrum band. For these operators, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via the first bidirectional link 225 or third bidirectional link 240) while data may, for example, be communicated in the unlicensed radio frequency spectrum band (e.g., via the second bidirectional link 230). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the base station 205-a may transmit OFDMA waveforms to the third UE 215-b using a bidirectional link 245 and may receive OFDMA waveforms, SC-FDMA waveforms, or resource block interleaved FDMA waveforms from the third UE 215-b using the bidirectional link 245. The bidirectional link 245 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 205-a or UEs 115, 215, 215-a, or 215-b as described with reference to FIG. 1 or 2, may use a gating interval to contend for access to a wireless channel of an unlicensed radio frequency spectrum band (e.g., to a physical channel of the unlicensed radio frequency spectrum band). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a sharing protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus is configured to perform a contention procedure (e.g., an LBT procedure) such as a clear channel assessment (CCA) procedure or an extended CCA (eCCA) procedure. The outcome of the CCA procedure or eCCA procedure may indicate to the transmitting apparatus whether a wireless channel of an unlicensed radio frequency spectrum band is available or in use for the gating interval (e.g., an LBT radio frame or transmission burst). When a CCA procedure or eCCA procedure indicates the wireless channel is available for a corresponding LBT radio frame or transmission burst (e.g., "clear" for use), the transmitting apparatus may reserve or use the wireless channel of the unlicensed radio frequency spectrum band during part or all of the LBT radio frame. When a CCA procedure or eCCA procedure indicates the wireless channel is not available (e.g., that the wireless channel is in use or reserved by another transmitting apparatus), the transmitting apparatus may be prohibited from using the wireless channel during the LBT radio frame. In some examples, a transmitting apparatus may perform a CCA procedure or eCCA procedure for some but not other wireless channels in an unlicensed radio frequency spectrum band.

Figure 3:
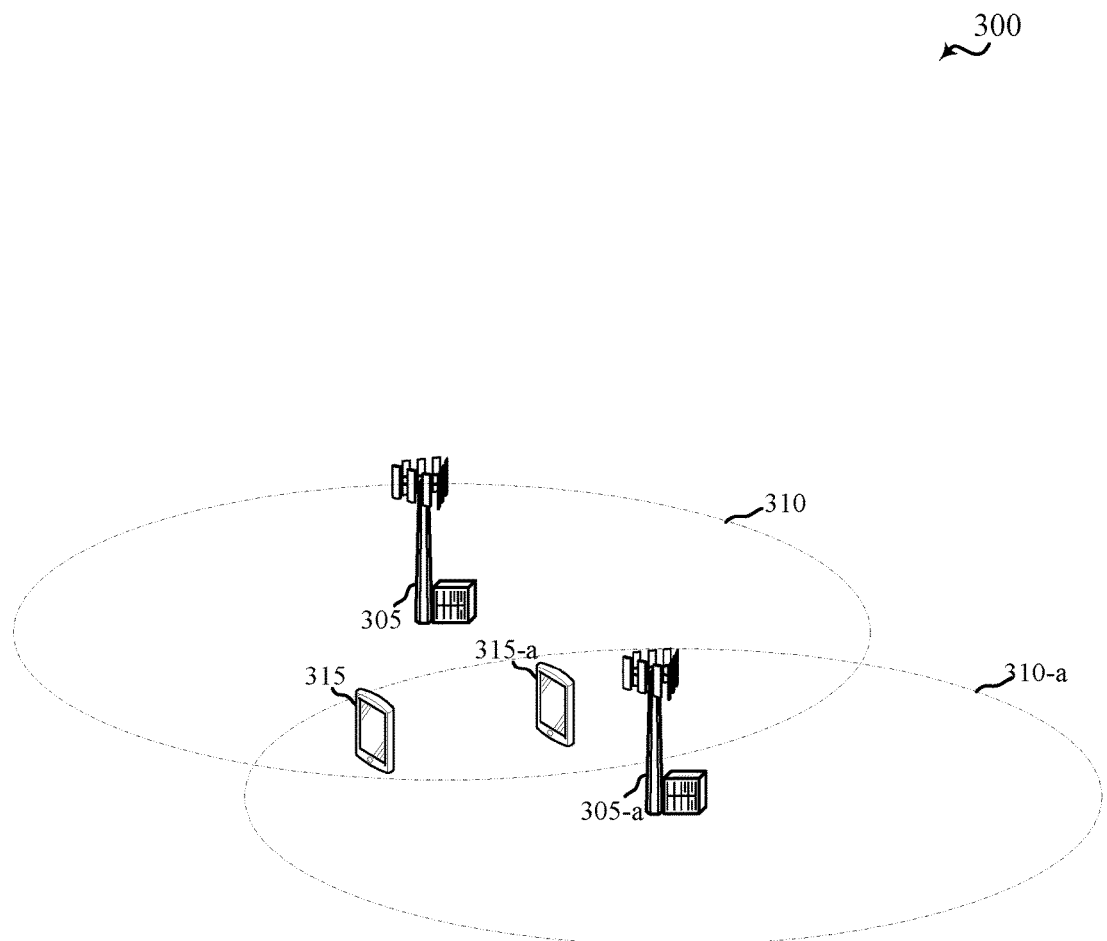
FIG. 3 shows a wireless communication system in which devices associated with different operators share a radio frequency spectrum band, in accordance with various aspects of the present disclosure.

FIG. 3 shows a wireless communication system 300 in which devices associated with different operators share a radio frequency spectrum band, in accordance with various aspects of the present disclosure. By way of examples, a first set of devices (e.g., a first base station 305 and a first UE 315) may be associated with a first operator, and a second set of devices (e.g., a second base station 305-a and a second UE 315-a) may be associated with a second operator. The first base station 305, the second base station 305-a, the first UE 315, and the second UE 315-a may be examples of the base stations 105, 205, or 205-a or UEs 115, 215, 215-a, or 215-b as described with reference to FIG. 1 or 2.

The first base station 305 may be associated with a first coverage area 310, and the second base station 305-a may be associated with a second coverage area 310-a. The first coverage area 310 and the second coverage area 310-a may overlap (as shown) or may not overlap. Regardless, the first base station 305 (or other devices associated with the first operator) and the second base station 305-a (or other devices associated with the second operator) may benefit from access to resources in a shared radio frequency spectrum band (e.g., a shared licensed radio frequency spectrum band or a shared unlicensed radio frequency spectrum band).

In some examples, the devices of the first operator and the devices of the second operator may have different loads, which loads may vary based at least in part on time of day or other factors. In some examples, the first operator and the second operator may pay different fees to access a shared radio frequency spectrum band. In some examples, one operator may be a dominant or incumbent operator. In some examples, the devices of the first operator or the devices of the second operator may desire to use a shared radio frequency spectrum band for transmissions configured for a minimum QoS. In all of these examples (and more), contention for access to resources of a shared radio frequency spectrum band may result in unfair access to the shared radio frequency spectrum band and/or an inadequate QoS when using the shared radio frequency spectrum band. The present disclosure therefore describes techniques that may be used, for example, to increase the likelihood that resource usage in a shared radio frequency spectrum band is fair and/or to improve the QoS associated with at least some resource usage in a shared radio frequency spectrum band.

Figure 4:
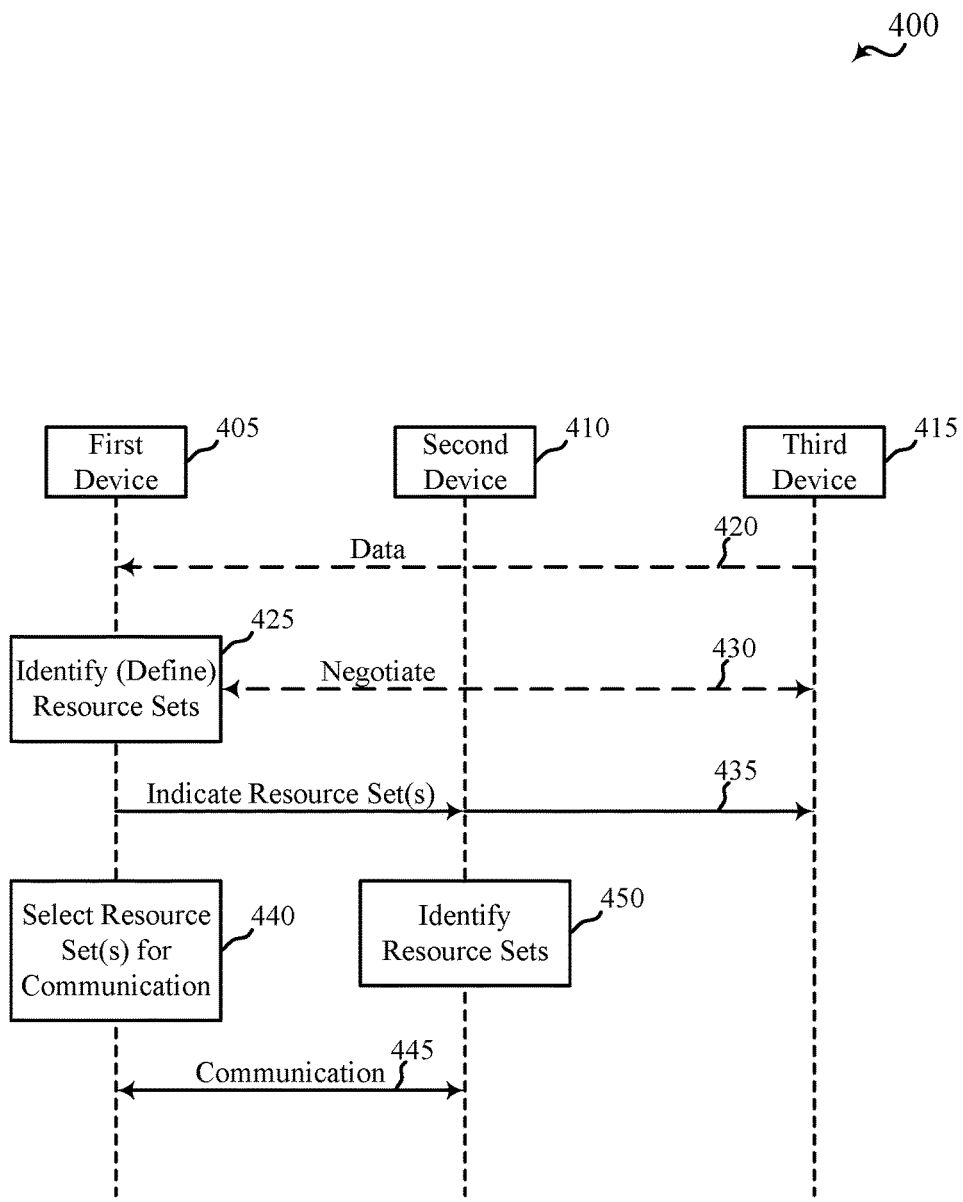
FIG. 4 shows a communication flow in which communication occurs between a first device, a second device, and a third device, in accordance with various aspects of the present disclosure.

FIG. 4 shows a communication flow 400 in which communication occurs between a first device 405, a second device 410, and a third device 415, in accordance with various aspects of the present disclosure. The communication flow 400 may be used, in some examples, to define a plurality of resource sets associated with different restriction levels for resource usage, and to communicate using one or more of the resource sets. In some examples, each of the first device 405, the second device 410, and the third device 415 may be a network access device (e.g., one of the base stations 105, 205, 205-a, 305, or 305-a as described with reference to FIG. 1, 2, or 3). In some examples, each of the first device 405 and the third device 415 may be a network access device, and the second device 410 may be a UE (e.g., one of the UEs 115, 215, 215-a, 215-b, 315, or 315-a as described with reference to FIG. 1, 2, or 3). Any one or more of the first device 405, the second device 410, or the third device 415 could also take other forms.

At 420, the first device 405 may optionally receive data from the third device 415 or other devices.

At 425, the first device 405 may identify (e.g., define) a first resource set, a second resource set, and a third resource set in a radio frequency spectrum band. In some examples, the first device 405 may define a first restriction level for resource usage for the first resource set, a second restriction level for resource usage for the second resource set, and a third restriction level for resource usage for the third resource set. In some examples, the first restriction level for resource usage may include an exclusive resource usage by a first set of devices that includes the first device 405, the second restriction level for resource usage may include a prohibition of resource usage by at least the first device 405, and the third restriction level for resource usage may include a contention-based resource usage by a second set of devices that includes the first device 405, the second device 410, and the third device 415. In some examples, the contention-based resource usage by the second set of devices may include one or more thresholds for determining whether resources in the third resource set are cleared for usage by the second set of devices. The thresholds may include, for example, different thresholds for different sets of devices, or different thresholds for different subsets of resources in the second resource set. For example, the thresholds may provide one set of devices with less restrictive access to resources in the second resource set, and provide another set of devices with more restrictive access to resources in the second resource set. Additionally or alternatively, the thresholds may provide less restrictive access to one subset of resources in the second resource set, and provide more restrictive access to another subset of resources in the second resource set.

A restriction level for resource usage that provides a set of devices exclusive resource usage of a resource set may enable a device in the set of devices to obtain access to the resource set with the same reliability as resources in a radio frequency spectrum band that are dedicated for use by the set of devices. Alternatively, semi-exclusive resource usage may be provided to a set of devices. An example of semi-exclusive resource usage includes a scenario in which a first set of devices is provided access to a resource set, a second set of devices is prohibited from accessing the resource set, but the first set of devices may have to contend for access to the resource set with a third set of devices. In some example, a resource set associated with a restriction level for usage that provides exclusive resource usage or semi-exclusive resource usage for a set of devices may be used by the set of devices for higher QoS transmissions, control transmissions, signaling, etc.

In some examples, the radio frequency spectrum band in which the resource sets are identified may be shared by devices associated with a first operator and devices associated with a second operator. By way of example, the first device 405 and second device 410 may be associated with the first operator, and the third device 415 may be associated with the second operator. In this context, and in some examples, the first restriction level for resource usage may include an exclusive resource usage by the devices associated with the first operator (e.g., the first set of devices), and a prohibition of resource usage by the devices associated with the second operator. In some examples, the second restriction level for resources usage may include a prohibition of resource usage by the devices associated with the first operator, including the first device 405, and an exclusive resource usage by the devices associated with the second operator.

The devices associated with different operators may be provided access to the same or different amounts of resources associated with a restriction level for resource usage that provides exclusive resource usage (or semi-exclusive resource usage). In some examples, the amount of such resources provided to the devices associated with an operator may be based at least in part on a licensing fee paid by the operator, negotiations based at least in part on network loads, etc., or other factors.

In some examples, the contention-based resource usage of the third restriction level for resource usage may allow contention-based access to the third resource set by devices associated with the first operator and devices associated with the second operator. In some examples, thresholds (e.g., contention thresholds) associated with the third resource set may provide devices associated with the first operator or devices associated with the second operator with more or less restrictive access to the second resource set. In some cases, thresholds associated with the second resource set may provide the devices associated with an operator with more or less restrictive access to different subsets of resources of the third resource set.

In some examples, the first resource set, the second resource set, and the third resource set may be defined based at least in part on: time-division multiplexing (TDM), frequency-division multiplexing (FDM), space-division multiplexing (SDM), or a combination thereof. In some examples, the first device 405 may define a size or periodicity of the first resource set, the second resource set, and the third resource set at 425. For example, the first device 405 may provide devices associated with the first operator with exclusive or semi-exclusive access to subframe 0 of a ten subframe superframe once every 80 ms, and provide devices associated with the second operator exclusive access to subframe 1 every 80 ms.

In some examples, the operations at 425 may include identifying (e.g., defining) one or more LBT procedures to be performed before accessing the third resource set (or when contending for access to a subset of the second resource set). In some examples, different LBT procedures may be defined. For example, the first device 405 may define a first LBT procedure to be performed by devices associated with the first operator, and a second LBT procedure to be performed by devices associated with the second operator, such that different contention for access thresholds are provided for the devices associated with the first operator compared to the devices associated with the second operator. The different contention for access thresholds may make access to the third resource set less restrictive for the devices associated with the first operator or the devices associated with the second operator. Additionally or alternatively, the first device 405 may define a first LBT procedure to be performed by the devices associated with an operator when contending for access to a first subset of resources of the third resource set, and a second LBT procedure to be performed by the devices when contending for access to a second subset of resources of the third resource set, such that different contention for access thresholds are provided for access to the first subset of resources and the second subset of resources. The different contention for access thresholds may make access to the first subset of resources or the second subset of resources less restrictive for the devices associated with the operator.

In some examples, the first resource set, second resource set, or third resource set defined at 425 may be defined based at least in part on the data received at 420 (or other received data), or based at least in part on an optional negotiation with the third device 415 (or other devices) at 430. The data may be received (at 420), or the definitions of the resource sets may be negotiated, based at least in part on data received or negotiations made over one or more wired communication links (e.g., via backhaul signaling), one or more wireless communication links (e.g., via over-the-air signaling), or a combination thereof. The definitions of the resource sets may also be defined based at least in part on a traffic load on one or more wired or wireless communication links (or at one or more devices).

In some examples, the first device 405 may associate each of the first resource set, the second resource set, and the third resource set with at least one of: uplink use, downlink use, or a combination thereof. Thus, a resource set may be defined for both uplink and downlink use, or separate resource sets may be defined for uplink use or downlink use. When separate resource sets are defined for uplink use or downlink use, a first resource set, a second resource set, and a third resource set may be defined for uplink used, and another three resource sets may be defined for downlink use.

In some examples, one or more of the first resource set, the second resource set, or the third resource set may not be defined. For example, a resource set associated with exclusive resource usage by a set of devices may not be defined or defining the set may be bypassed when the set of devices primarily transmits data on an uplink and infrequently receives data on a downlink.

In some examples, a first partition of resources between the first resource set, the second resource set, and the third resource set may be defined by the first device 405 at a first time instance (e.g., at 425), and a second partition of resources for the first resource set, the second resource set, and the third resource set may be defined by the first device 405 (or another device) at a second time instance. In this manner, a partition of resources may be dynamically adjusted based at least in part on changes in one or more dynamic factors. For example, an operator may be provided a smaller resource set associated with exclusive or semi-exclusive resource usage by devices associated with the operator at night, and may be provided a different resource set (e.g., a larger resource set) or additional resource set associated with exclusive or semi-exclusive resource usage during the day. In one example, the smaller resource set may be used for machine-type communications of the operator, and the larger resource set may be used for signaling, control information, VoIP traffic, or high QoS smart phone traffic.

At 435, the first device 405 may indicate the first resource set, the second resource set, the third resource set, or a combination thereof to the second device 410, the third device 415, or other devices. The indications may be made over wired or wireless communication links, and may include indications made to one or more devices associated with the first operator, the second operator, or other operators.

At 440, the first device 405 may select at least one resource set for communicating with the second device 410 at 445. The at least one resource set may be selected from the first resource set, the second resource set, or the third resource set. In some examples, the at least one resource set for communicating with the second device 410 may be selected based at least in part on: an operator associated with the first device 405 (or second device 410), a characteristic of the communication, or a combination thereof. In some examples, the characteristic of the communication may be based at least in part on: the communication being associated with a quality of service (QoS) satisfying a threshold QoS, the communication including a type of control communication, the communication including a type of signaling, the communication including a type of synchronization signal, the communication being a broadcast communication type, the communication being associated with time tracking, the communication being associated with frequency tracking, the communication being associated with measurement or discovery of cells, or a combination thereof. For example, resources of the first resource set may be selected for a high QoS communication, and resources of the third resource set may be selected for a latency tolerant communication.

In some examples, the first device 405, the second device 410, or the third device 415 may operate at least one aspect of the first resource set and the third resource set jointly or separately. In some examples, the at least one jointly or separately operated aspect of the first resource set and the third resource set may include: a HARQ process, a power control parameter, or a combination thereof. In a separate operation example, a HARQ response for a transmission using resources of the first resource set may be provided by other resources of the first resource set, but not by resources of the third resource set. In a joint operation example, a HARQ response for a transmission using resources of the first resource set may be provided by other resources of the first resource set, or by resources of the third resource set. In another separate operation example, a first set of open loop and/or closed loop power control parameters may be provided for the first resource set, and a second set of open loop and/or closed loop power control parameters may be provided for the second resource set. Alternatively, in a joint operation example, a single set of open loop and/or closed loop power control parameters may be provided for use by both the first resource set and the second resource set.

At 450, the second device 410 may optionally identify the first resource set, the second resource set, and the third resource set, and their respective restriction levels for resource usage, and may communicate with the first device 405, at 445, using at least one resource set of the first resource set, the second resource set, or the third resource set. The at least one resource set may be based at least in part on the first restriction level for resource usage, the second restriction level for resource usage, or the third restriction level for resource usage.

Figure 5:
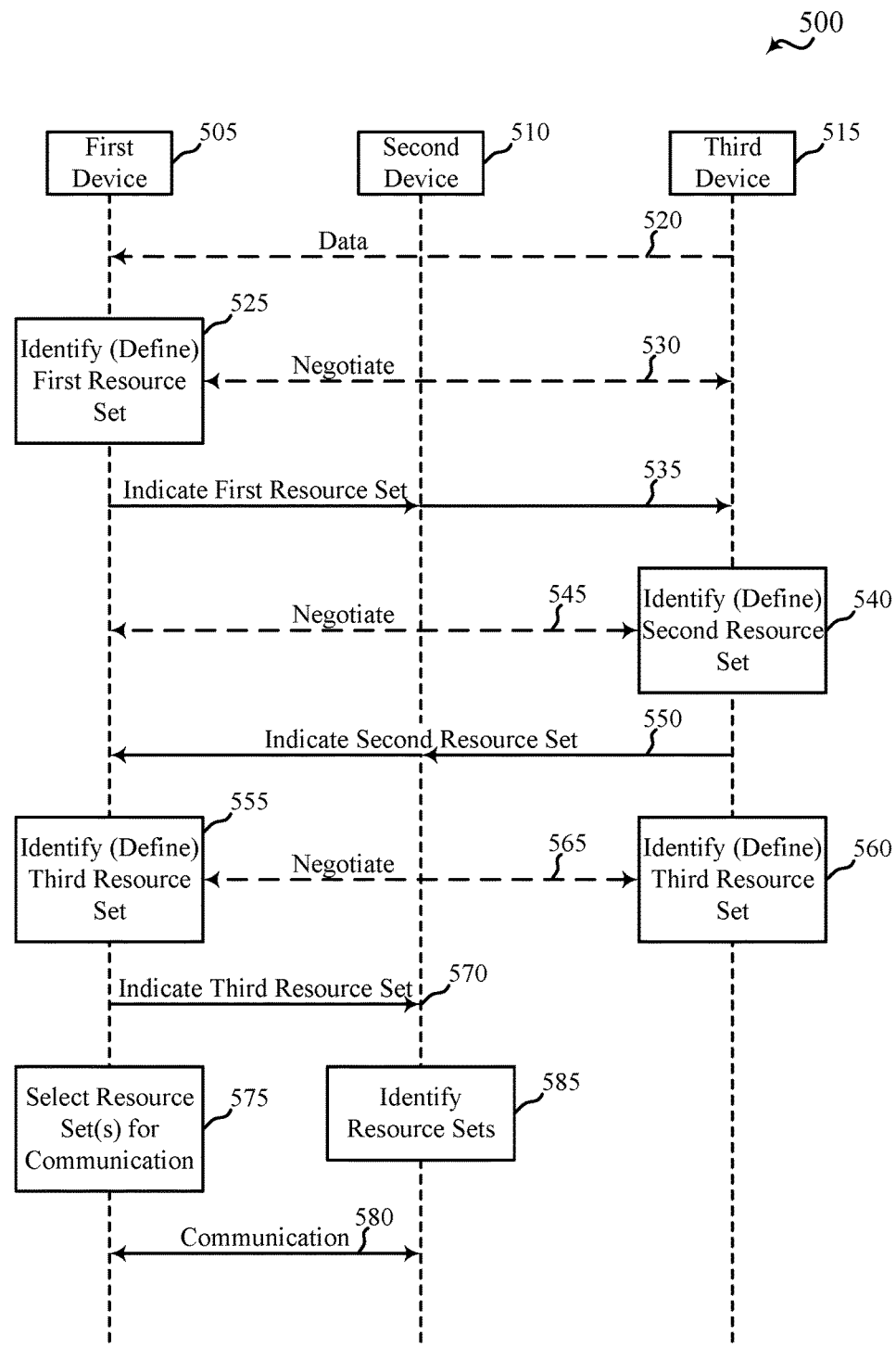
FIG. 5 shows a communication flow in which communication occurs between a first device, a second device, and a third device, in accordance with various aspects of the present disclosure.

FIG. 4 shows an example of resource set identification when resource set identification is centralized, or when the first device 405 is a device of a dominant or incumbent operator. FIG. 5 shows an example of resource set identification when resource set identification is distributed (e.g., distributed among the devices associated with multiple operators).

FIG. 5 shows a communication flow 500 in which communication occurs between a first device 505, a second device 510, and a third device 515, in accordance with various aspects of the present disclosure. The communication flow 500 may be used, in some examples, to define a plurality of resource sets associated with different restriction levels for resource usage, and to communicate using one or more of the resource sets. In some examples, each of the first device 505, the second device 510, and the third device 515 may be a network access device (e.g., one of the base stations 105, 205, 205-a, 305, or 305-a as described with reference to FIG. 1, 2, or 3). In some examples, each of the first device 505 and the third device 515 may be a network access device, and the second device 510 may be a UE (e.g., one of the UEs 115, 215, 215-a, 215-b, 315, or 315-a as described with reference to FIG. 1, 2, or 3). Any one or more of the first device 505, the second device 510, or the third device 515 could also take other forms.

At 520, the first device 505 may optionally receive data from the third device 515 or other devices. Similarly (not shown), the third device 515 may optionally receive data from the first device 505 or other devices.

At 525, the first device 505 may identify (e.g., define) a first resource set in a radio frequency spectrum band. In some examples, the first device 505 may define a first restriction level for resource usage for the first resource set. In some examples, the first restriction level for resource usage may include an exclusive resource usage by a first set of devices that includes the first device 505.

A restriction level for resource usage that provides a set of devices exclusive resource usage of a resource set may enable a device in the set of devices to obtain access to the resource set with the same reliability as resources in a radio frequency spectrum band that is dedicated for use by the set of devices. Alternatively, semi-exclusive resource usage may be provided to a set of devices.

At 535, the first device 505 may indicate the first resource set to the second device 510, the third device 515, or other devices. The indications may be made over wired or wireless communication links, and may include indications made to one or more devices associated with a first operator, a second operator, or other operators.

At 540, the third device 515 may identify (e.g., define) a second resource set in the radio frequency spectrum band. In some examples, the third device 515 may define a second restriction level for resource usage for the second resource set. In some examples, the second restriction level for resource usage may include an exclusive resource usage by a second set of devices that includes the third device 515.

At 550, the third device 515 may indicate the second resource set to the first device 505, the second device 510, or other devices. The indications may be made over wired or wireless communication links, and may include indications made to one or more devices associated with a first operator, a second operator, or other operators.

At 555 or 560, the first device 505 or third device 515 may identify (e.g., define) a third resource set in the radio frequency spectrum band. In some examples, the first device 505 or third device 515 may define a third restriction level for resource usage for the third resource set. In some examples, the third restriction level for resource usage may include a contention-based resource usage by a third set of devices that includes the first device 505, the second device 510, and the third device 515. In some examples, the contention-based resource usage by the second set of devices may include one or more thresholds for determining whether resources in the third resource set are cleared for usage by the second set of devices. The thresholds may include, for example, different thresholds for different sets of devices, or different thresholds for different subsets of resources in the second resource set. For example, the thresholds may provide one set of devices with less restrictive access to resources in the second resource set, and provide another set of devices with more restrictive access to resources in the second resource set. Additionally or alternatively, the thresholds may provide less restrictive access to one subset of resources in the second resource set, and provide more restrictive access to another subset of resources in the second resource set.

At 570, the first device 505 may indicate the third resource set to the second device 510, the third device 515, or other devices.

In some examples, the radio frequency spectrum band in which the resource sets are identified may be shared by devices associated with a first operator and devices associated with a second operator. By way of example, the first device 505 and second device 510 may be associated with the first operator, and the third device 515 may be associated with the second operator. In this context, and in some examples, the first restriction level for resource usage may include an exclusive resource usage by the devices associated with the first operator (e.g., the first set of devices), and a prohibition of resource usage by the devices associated with the second operator (e.g., the second set of devices). In some examples, the second restriction level for resource usage may include an exclusive resource usage by the devices associated with the second operator (e.g., the second set of devices), and a prohibition of resource usage by the devices associated with the first operator (e.g., the first set of devices).

The devices associated with different operators may be provided access to the same or different amounts of resources associated with a restriction level for resource usage that provides exclusive resource usage (or semi-exclusive resource usage). In some examples, the amount of such resources provided to the devices associated with an operator may be based at least in part on a licensing fee paid by the operator, negotiations based at least in part on network loads, etc., or other factors.

In some examples, the contention-based resource usage of the third restriction level for resource usage may allow contention-based access to the third resource set by devices associated with the first operator and devices associated with the second operator. In some examples, thresholds (e.g., contention thresholds) associated with the third resource set may provide devices associated with the first operator or devices associated with the second operator with more or less restrictive access to the third resource set. In some cases, thresholds associated with the third resource set may provide the devices associated with an operator with more or less restrictive access to different subsets of resources of the third resource set.

In some examples, the first resource set, the second resource set, and the third resource set may be defined based at least in part on: TDM, FDM, SDM, or a combination thereof. In some examples, the first device 505 may define a size or periodicity of the first resource set, and the third device 515 may define a size or periodicity of the second resource set. For example, the first device 505 may provide devices associated with the first operator with exclusive or semi-exclusive access to subframe 0 of a ten subframe superframe once every 80 ms, and the third device 515 may provide devices associated with the second operator exclusive access to subframe 1 every 80 ms.

In some examples, the operations at 555 or 560 may include identifying (e.g., defining) one or more LBT procedures to be performed before accessing the third resource set (or when contending for access to a subset of the second resource set). In some examples, different LBT procedures may be defined. For example, the first device 505 may define a first LBT procedure to be performed by devices associated with the first operator, and a second LBT procedure to be performed by devices associated with the second operator, such that different contention for access thresholds are provided for the devices associated with the first operator compared to the devices associated with the second operator. The different contention for access thresholds may make access to the third resource set less restrictive for the devices associated with the first operator or the devices associated with the second operator. Additionally or alternatively, the first device 505 may define a first LBT procedure to be performed by the devices associated with an operator when contending for access to a first subset of resources of the third resource set, and a second LBT procedure to be performed by the devices when contending for access to a second subset of resources of the third resource set, such that different contention for access thresholds are provided for access to the first subset of resources and the second subset of resources. The different contention for access thresholds may make access to the first subset of resources or the second subset of resources less restrictive for the devices associated with the operator. The third device 515 may define similar thresholds.

In some examples, the first resource set, second resource set, or third resource set defined at 525, 540, 555, or 560 may be defined based at least in part on the data received at 520 (or other received data), or based at least in part on optional negotiations between the first device 505 and the third device 515 (or other devices) at 530, 545, or 565. The data may be received (at 520), or the definitions of the resource sets may be negotiated, based at least in part on data received or negotiations made over one or more wired communication links (e.g., via backhaul signaling), one or more wireless communication links (e.g., via over-the-air signaling), or a combination thereof. The definitions of the resource sets may also be defined based at least in part on a traffic load on one or more wired or wireless communication links (or at one or more devices).

In some examples, the first device 505 or the third device 515 may associate each of the first resource set, the second resource set, and the third resource set with at least one of: uplink use, downlink use, or a combination thereof. Thus, a resource set may be defined for both uplink and downlink use, or separate resource sets may be defined for uplink use or downlink use. When separate resource sets are defined for uplink use or downlink use, a first resource set, a second resource set, and a third resource set may be defined for uplink used, and another three resource sets may be defined for downlink use.

In some examples, one or more of the first resource set, the second resource set, or the third resource set may not be defined. For example, a resource set associated with exclusive resource usage by a set of devices may not be defined or defining the set may be bypassed when the set of devices primarily transmits data on an uplink and infrequently receives data on a downlink.

In some examples, a first partition of resources between the first resource set, the second resource set, and the third resource set may be defined by the first device 505 and the third device 515 at a first time instance (e.g., at 525), and a second partition of resources for the first resource set, the second resource set, and the third resource set may be defined by the first device 505 and the third device 515 (or other devices) at a second time instance. In this manner, a partition of resources may be dynamically adjusted based at least in part on changes in one or more dynamic factors. For example, an operator may be provided a smaller resource set associated with exclusive or semi-exclusive resource usage by devices associated with the operator at night, and may be provided a different resource set (e.g., a larger resource set) or additional resource set associated with exclusive or semi-exclusive resource usage during the day. In one example, the smaller resource set may be used for machine-type communications of the operator, and the larger resource set may be used for signaling, control information, VoIP traffic, or high QoS smart phone traffic.

At 575, the first device 505 may select at least one resource set for communicating with the second device 510 at 580. The at least one resource set may be selected from the first resource set, the second resource set, or the third resource set. In some examples, the at least one resource set for communicating with the second device 510 may be selected based at least in part on: an operator associated with the first device 505 (or second device 510), a characteristic of the communication, or a combination thereof. In some examples, the characteristic of the communication may be based at least in part on: the communication being associated with a QoS satisfying a threshold QoS, the communication including a type of control communication, the communication including a type of signaling, the communication including a type of synchronization signal, the communication being a broadcast communication type, the communication being associated with time tracking, the communication being associated with frequency tracking, the communication being associated with measurement or discovery of cells, or a combination thereof. For example, resources of the first resource set may be selected for a high QoS communication, and resources of the third resource set may be selected for a latency tolerant communication.

In some examples, the first device 505, the second device 510, or the third device 515 may operate at least one aspect of the first resource set and the third resource set jointly or separately. In some examples, the at least one jointly or separately operated aspect of the first resource set and the third resource set may include: a HARQ process, a power control parameter, or a combination thereof. In a separate operation example, a HARQ response for a transmission using resources of the first resource set may be provided by other resources of the first resource set, but not by resources of the third resource set. In a joint operation example, a HARQ response for a transmission using resources of the first resource set may be provided by other resources of the first resource set, or by resources of the third resource set. In another separate operation example, a first set of open loop and/or closed loop power control parameters may be provided for the first resource set, and a second set of open loop and/or closed loop power control parameters may be provided for the second resource set. Alternatively, in a joint operation example, a single set of open loop and/or closed loop power control parameters may be provided for use by both the first resource set and the second resource set.

At 585, the second device 510 may optionally identify the first resource set, the second resource set, and the third resource set, and their respective restriction levels for resource usage, and may communicate with the first device 505, at 580, using at least one resource set of the first resource set, the second resource set, or the third resource set. The at least one resource set may be based at least in part on the first restriction level for resource usage, the second restriction level for resource usage, or the third restriction level for resource usage.

Figure 6:
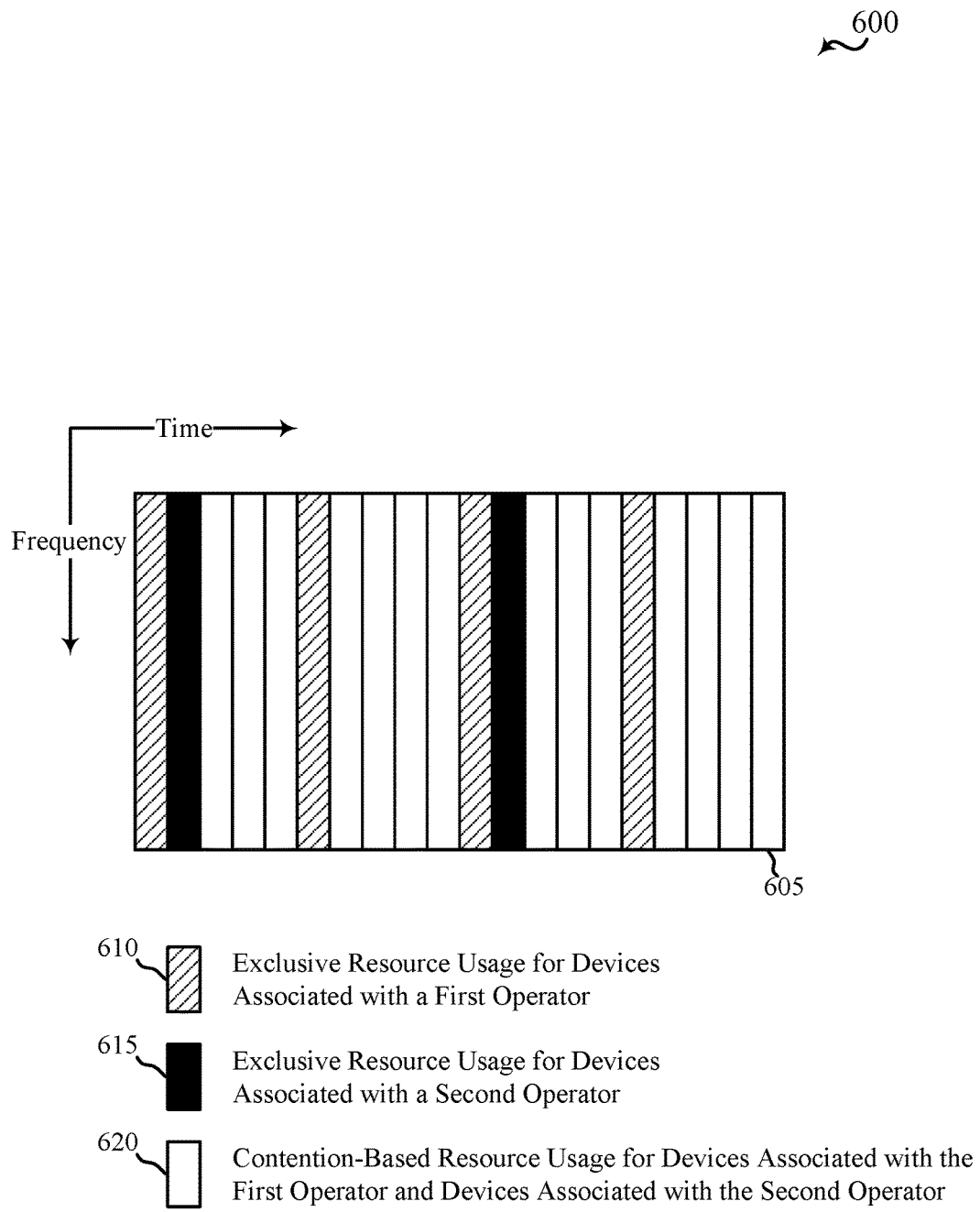
FIG. 6 shows a time-frequency representation of resources of a radio frequency spectrum band allocable to a plurality of devices, in accordance with various aspects of the present disclosure.

FIG. 6 shows a time-frequency representation 600 of resources 605 of a radio frequency spectrum band allocable to a plurality of devices, in accordance with various aspects of the present disclosure. In some examples, the plurality of devices may include devices associated with a first operator and devices associated with a second operator.

By way of example, FIG. 6 shows a first resource set 610 associated with a first restriction level for resource usage including an exclusive resource usage by the devices associated with the first operator and a prohibition of resource usage by the devices associated with the second operator. FIG. 6 also shows a second resource set 615 associated with a second restriction level for resource usage including an exclusive resource usage by the devices associated with the second operator and a prohibition of resource usage by the devices associated with the first operator. FIG. 6 further shows a third resource set 620 associated with a third restriction level for resource usage including a contention-based resource usage the devices associated with the first operator and the devices associated with the second operator. The first and second restriction levels for resource usage provide each of the first operator and the second operator with a resource set that the devices of the operator can access exclusively (or semi-exclusively, but without competing against devices of the other operator for access to the resources). The third restriction level for resource usage provides each of the first operator and the second operator with a contention-based resource set.

By way of further example, the resources 605 are partitioned using TDM techniques, and the first resource set includes more resources than the second resource set.

Figure 7:
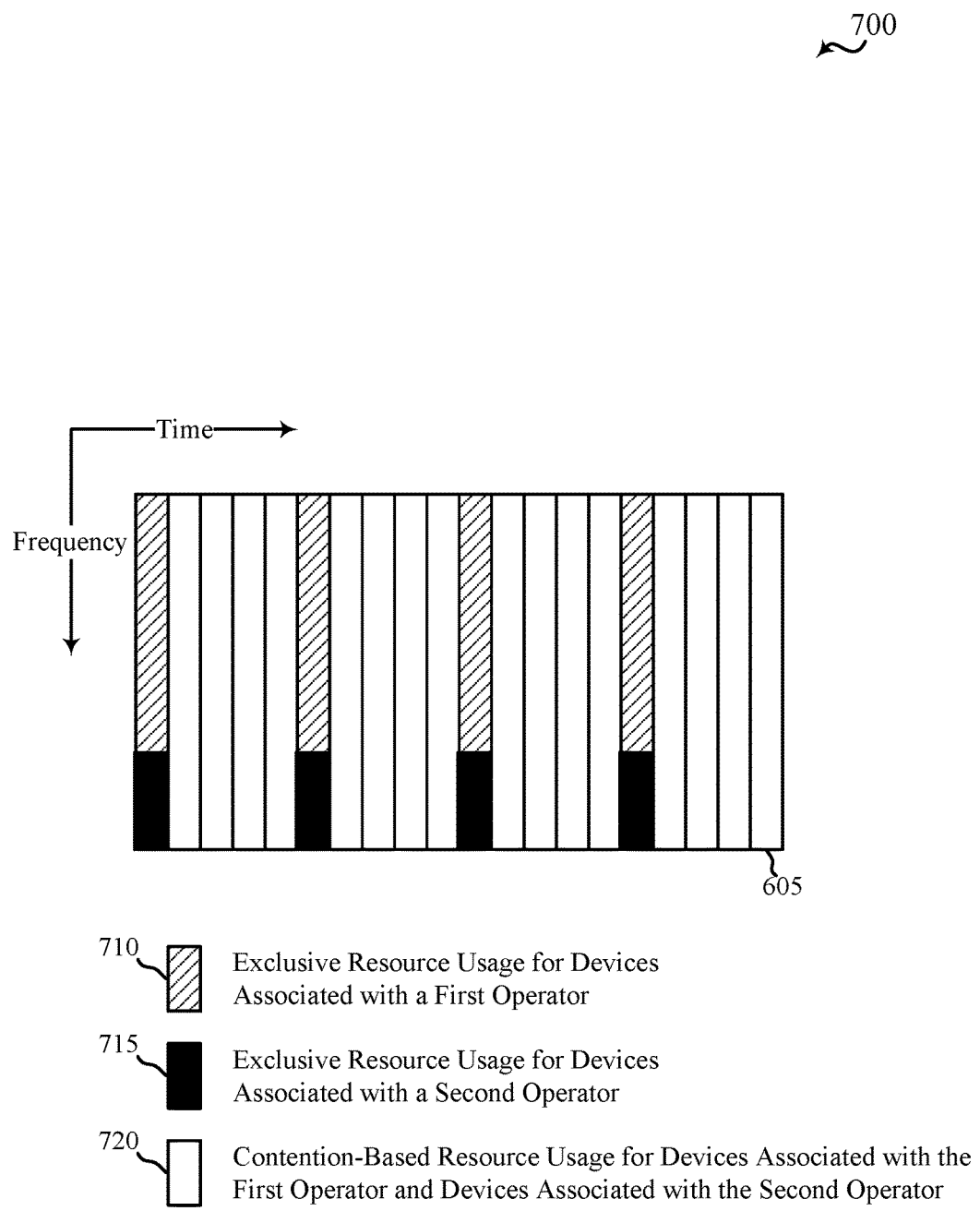
FIG. 7 shows a time-frequency representation of resources of a radio frequency spectrum band allocable to a plurality of devices, in accordance with various aspects of the present disclosure.

FIG. 7 shows a time-frequency representation 700 of resources 705 of a radio frequency spectrum band allocable to a plurality of devices, in accordance with various aspects of the present disclosure. In some examples, the plurality of devices may include devices associated with a first operator and devices associated with a second operator.

By way of example, FIG. 7 shows a first resource set 710 associated with a first restriction level for resource usage including an exclusive resource usage by the devices associated with the first operator and a prohibition of resource usage by the devices associated with the second operator. FIG. 7 also shows a second resource set 715 associated with a second restriction level for resource usage including an exclusive resource usage by the devices associated with the second operator and a prohibition of resource usage by the devices associated with the first operator. FIG. 7 further shows a third resource set 720 associated with a third restriction level for resource usage including a contention-based resource usage the devices associated with the first operator and the devices associated with the second operator. The first and second restriction levels for resource usage provide each of the first operator and the second operator with a resource set that the devices of the operator can access exclusively (or semi-exclusively, but without competing against devices of the other operator for access to the resources). The third restriction level for resource usage provides each of the first operator and the second operator with a contention-based resource set.

By way of further example, the resources 705 are partitioned using FDM techniques, and the first resource set includes more resources than the second resource set.

FIGS. 6 and 7 show examples of resource allocations. In other examples, resources may be allocated in accordance with TDM, FDM, SDM, or other techniques, to resource sets having the same or different sizes.

Figure 8:
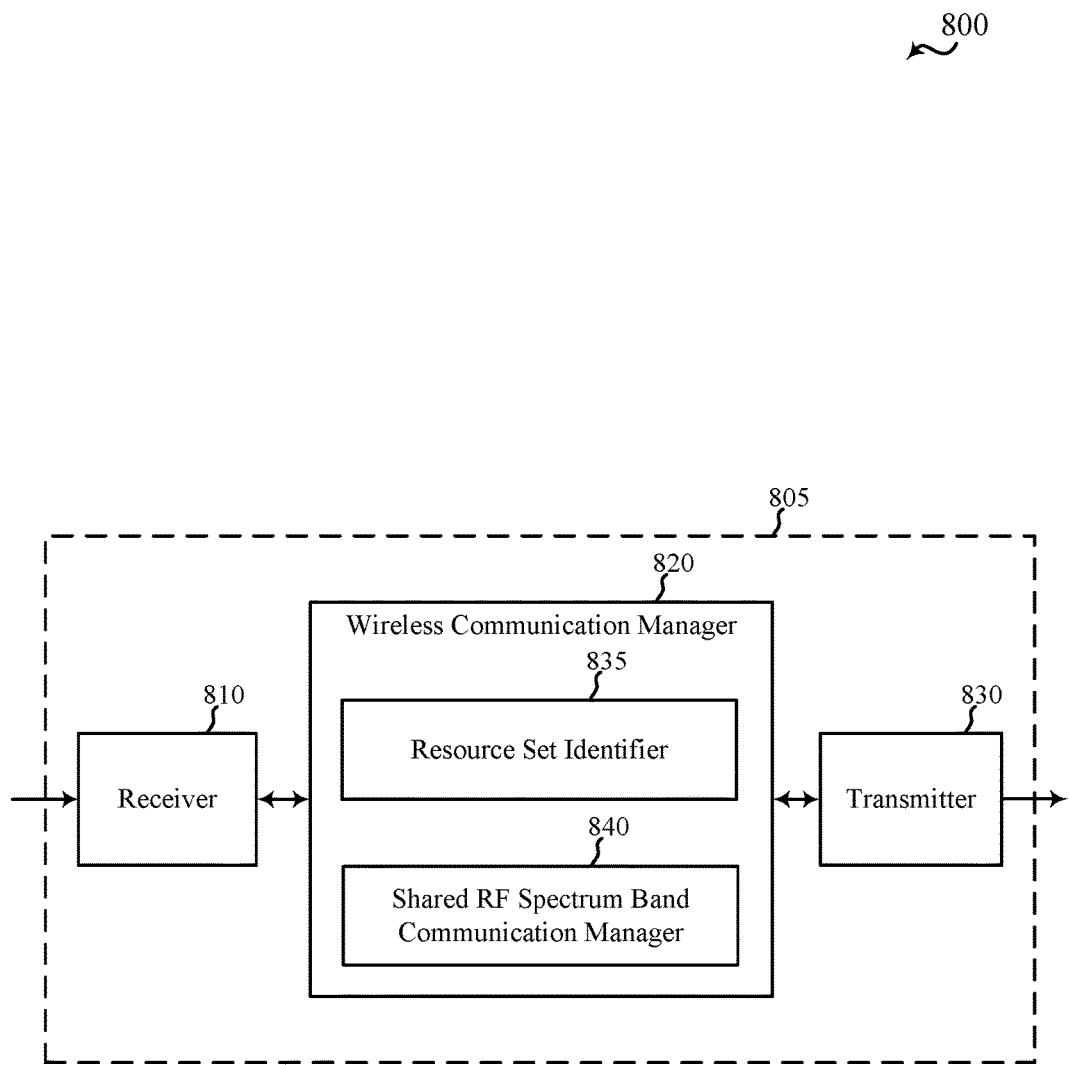
FIG. 8 shows a block diagram of an apparatus for use in wireless communication by a first device, in accordance with various aspects of the present disclosure.

FIG. 8 shows a block diagram 800 of an apparatus 805 for use in wireless communication by a first device, in accordance with various aspects of the present disclosure. The apparatus 805 may be an example of aspects of one or more of the base stations 105, 205, 205-a, 305, or 305-a as described with reference to FIG. 1, 2, or 3, aspects of one or more of the UEs 115, 215, 215-a, 215-b, 315, or 315-a as described with reference to FIG. 1, 2, or 3, or aspects of one or more of the devices 405, 410, 415, 505, 510, or 515 as described with reference to FIG. 4 or 5. The apparatus 805 may also be or include a processor. The apparatus 805 may include a receiver 810, a wireless communication manager 820, or a transmitter 830. Each of these components may be in communication with each other.

The components of the apparatus 805 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one radio frequency (RF) receiver, such as at least one RF receiver operable to receive transmissions over a radio frequency spectrum band dedicated for use by devices associated with a first operator (which devices may include the first device and the apparatus 805), or over a radio frequency spectrum band shared by the devices associated with the first operator and devices associated with a second operator. In some examples, the dedicated radio frequency spectrum band or the shared radio frequency spectrum band may be used for LTE/LTE-A communications, as described, for example, with reference to FIG. 1, 2, 3, 4, 5, 6, or 7. In some examples, the receiver 810 may include at least one receiver for receiving transmissions over a wired communication link. The receiver 810 may be used to receive various types of data or control signals or information (i.e., "transmissions") over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the transmitter 830 may include at least one RF transmitter, such as at least one RF transmitter operable to transmit over the dedicated radio frequency spectrum band or the shared radio frequency spectrum band. In some examples, the transmitter 830 may include at least one transmitter for transmitting over a wired communication link. The transmitter 830 may be used to transmit various types of data or control signals or information (i.e., "transmissions") over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the wireless communication manager 820 may be used to manage one or more aspects of wireless communication for a device (e.g., a first device) including the apparatus 805. In some examples, part of the wireless communication manager 820 may be incorporated into or shared with the receiver 810 or the transmitter 830. In some examples, the wireless communication manager 820 may include a resource set identifier 835 or a shared RF spectrum band communication manager 840.

The resource set identifier 835 may be used to identify a first resource set, a second resource set, and a third resource set in a radio frequency spectrum band. In some examples, the radio frequency spectrum band may be shared by devices associated with a first operator and devices associated with a second operator. The first resource set, the second resource set, and the third resource set may be respectively associated with a first restriction level for resource usage, a second restriction level for resource usage, and a third restriction level for resource usage. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the first device (including the apparatus 805) may be associated with a first operator, and the second restriction level for resources usage may include a prohibition of resource usage by devices associated with the first operator and an exclusive resource usage by devices associated with a second operator. In some examples, the contention-based resource usage by the second set of devices may include one or more thresholds for determining whether resources in the third resource set are cleared for usage by the second set of devices.

In some examples, the resource set identifier 835 may identify the first resource set, the second resource set, and the third resource set based at least in part on: TDM, FDM, SDM, or a combination thereof. In some examples, each of the first resource set, the second resource set, and the third resource set may be associated with at least one of: uplink use, downlink use, or a combination thereof. In some examples, the resource set identifier 835 may identify the first resource set, the second resource set, and the third resource set based at least in part on: a wired communication link, a wireless communication link, or a combination thereof.

The shared RF spectrum band communication manager 840 may be used to communicate with a second device using at least one resource set of the first resource set, the second resource set, or the third resource set. The at least one resource set may be based at least in part on the first restriction level for resource usage, the second restriction level for resource usage, or the third restriction level for resource usage.

Figure 9:
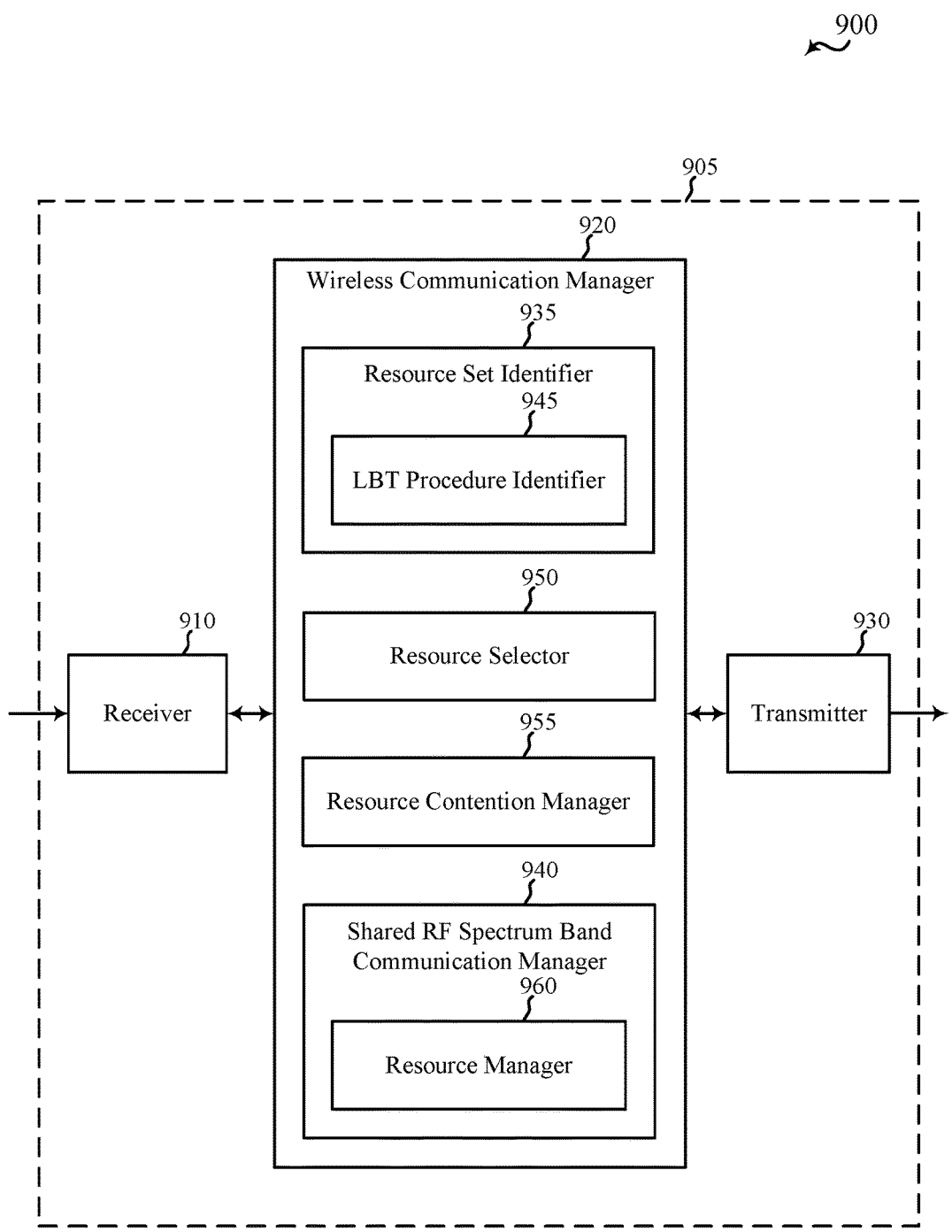
FIG. 9 shows a block diagram of an apparatus for use in wireless communication by a first device, in accordance with various aspects of the present disclosure.

FIG. 9 shows a block diagram 900 of an apparatus 905 for use in wireless communication by a first device, in accordance with various aspects of the present disclosure. The apparatus 905 may be an example of aspects of one or more of the base stations 105, 205, 205-a, 305, or 305-a as described with reference to FIG. 1, 2, or 3, aspects of one or more of the UEs 115, 215, 215-a, 215-b, 315, or 315-a as described with reference to FIG. 1, 2, or 3, aspects of one or more of the devices 405, 410, 415, 505, 510, or 515 as described with reference to FIG. 4 or 5, or aspects of the apparatus 805 as described with reference to FIG. 8. The apparatus 905 may also be or include a processor. The apparatus 905 may include a receiver 910, a wireless communication manager 920, or a transmitter 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a radio frequency spectrum band dedicated for use by devices associated with a first operator (which devices may include the first device and the apparatus 905), or over a radio frequency spectrum band shared by the devices associated with the first operator and devices associated with a second operator. In some examples, the dedicated radio frequency spectrum band or the shared radio frequency spectrum band may be used for LTE/LTE-A communications, as described, for example, with reference to FIG. 1, 2, 3, 4, 5, 6, or 7. In some examples, the receiver 910 may include at least one receiver for receiving transmissions over a wired communication link. The receiver 910 may be used to receive various types of data or control signals or information (i.e., "transmissions") over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the transmitter 930 may include at least one RF transmitter, such as at least one RF transmitter operable to transmit over the dedicated radio frequency spectrum band or the shared radio frequency spectrum band. In some examples, the transmitter 930 may include at least one transmitter for transmitting over a wired communication link. The transmitter 930 may be used to transmit various types of data or control signals or information (i.e., "transmissions") over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the wireless communication manager 920 may be used to manage one or more aspects of wireless communication for a device (e.g., a first device) including the apparatus 905. In some examples, part of the wireless communication manager 920 may be incorporated into or shared with the receiver 910 or the transmitter 930. In some examples, the wireless communication manager 920 may include a resource set identifier 935, a resource set selector 950, a resource contention manager 955, or a shared RF spectrum band communication manager 940. In some examples, the resource set identifier 935 may include a LBT procedure identifier 945. In some examples, the shared RF spectrum band communication manager 940 may include a resource manager 960.

The resource set identifier 935 may be used to identify a first resource set, a second resource set, and a third resource set in a radio frequency spectrum band. In some examples, the resource set identifier 935 may receive an indication of resources associated with at least one of: the first resource set, the second resource set, or the third resource set. In some examples, the radio frequency spectrum band may be shared by devices associated with a first operator and devices associated with a second operator. The first resource set, the second resource set, and the third resource set may be respectively associated with a first restriction level for resource usage, a second restriction level for resource usage, and a third restriction level for resource usage. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the first device (including the apparatus 905) may be associated with a first operator, and the second restriction level for resources usage may include a prohibition of resource usage by devices associated with the first operator and an exclusive resource usage by devices associated with a second operator. In some examples, the contention-based resource usage by the second set of devices may include one or more thresholds for determining whether resources in the third resource set are cleared for usage by the second set of devices.

In some examples, the resource set identifier 935 may identify the first resource set, the second resource set, and the third resource set based at least in part on: TDM, FDM, SDM, or a combination thereof. In some examples, each of the first resource set, the second resource set, and the third resource set may be associated with at least one of: uplink use, downlink use, or a combination thereof. In some examples, the resource set identifier 935 may identify the first resource set, the second resource set, and the third resource set based at least in part on: a wired communication link, a wireless communication link, or a combination thereof.

In some examples, the resource set identifier 935 may determine a first partition of resources for the first resource set, the second resource set, and the third resource set at a first time instance, and determine a second partition of resources for the first resource set, the second resource set, and the third resource set at a second time instance.

The LBT procedure identifier 945 may be used to identify a first LBT procedure to be performed by devices associated with a first operator before accessing the third resource set, and to identify a second LBT procedure to be performed by devices associated with a second operator before accessing the third resource set. The first LBT procedure and the second LBT procedure may provide different contention for access thresholds.

The resource set selector 950 may be used to select at least one resource set for communicating with a second device. The at least one resource set may be selected from the first resource set, the second resource set, or the third resource set. The selection of the at least one resource set may be based at least in part on the first restriction level for resource usage, the second restriction level for resource usage, or the third restriction level for resource usage. In some examples, the at least one resource set for communicating with the second device may be selected based at least in part on: an operator associated with the first device, a characteristic of the communication, or a combination thereof. In some examples, the characteristic of the communication may be based at least in part on: the communication being associated with a QoS satisfying a threshold QoS, the communication including a type of control communication, the communication comprising a type of signaling, the communication comprising a type of synchronization signal, the communication being a broadcast communication type, the communication being associated with time tracking, the communication being associated with frequency tracking, the communication being associated with measurement or discovery of cells, or a combination thereof.

The resource contention manager 955 may be used to contend for access to resources of the third resource set when the third resource set is selected by the resource set selector 950 for communication with the second device. When the contention for access is successful, the resources of the third resource set may be used for communication with the second device. When the contention for access is not successful, the resources of the third resource set may not be used for communication with the second device.

The shared RF spectrum band communication manager 940 may be used to communicate with the second device using the at least one resource set selected by the resource set selector 950.

The resource manager 960 may be used to operate at least one aspect of the first resource set and the third resource set jointly, or alternatively, separately. In some examples, the at least one jointly or separately operated aspect of the first resource set and the third resource set may include: a HARQ process, a power control parameter, or a combination thereof.

In some examples, aspects of the apparatuses 805 and 905 as described with reference to FIGS. 8 and 9 may be combined.

Figure 10:
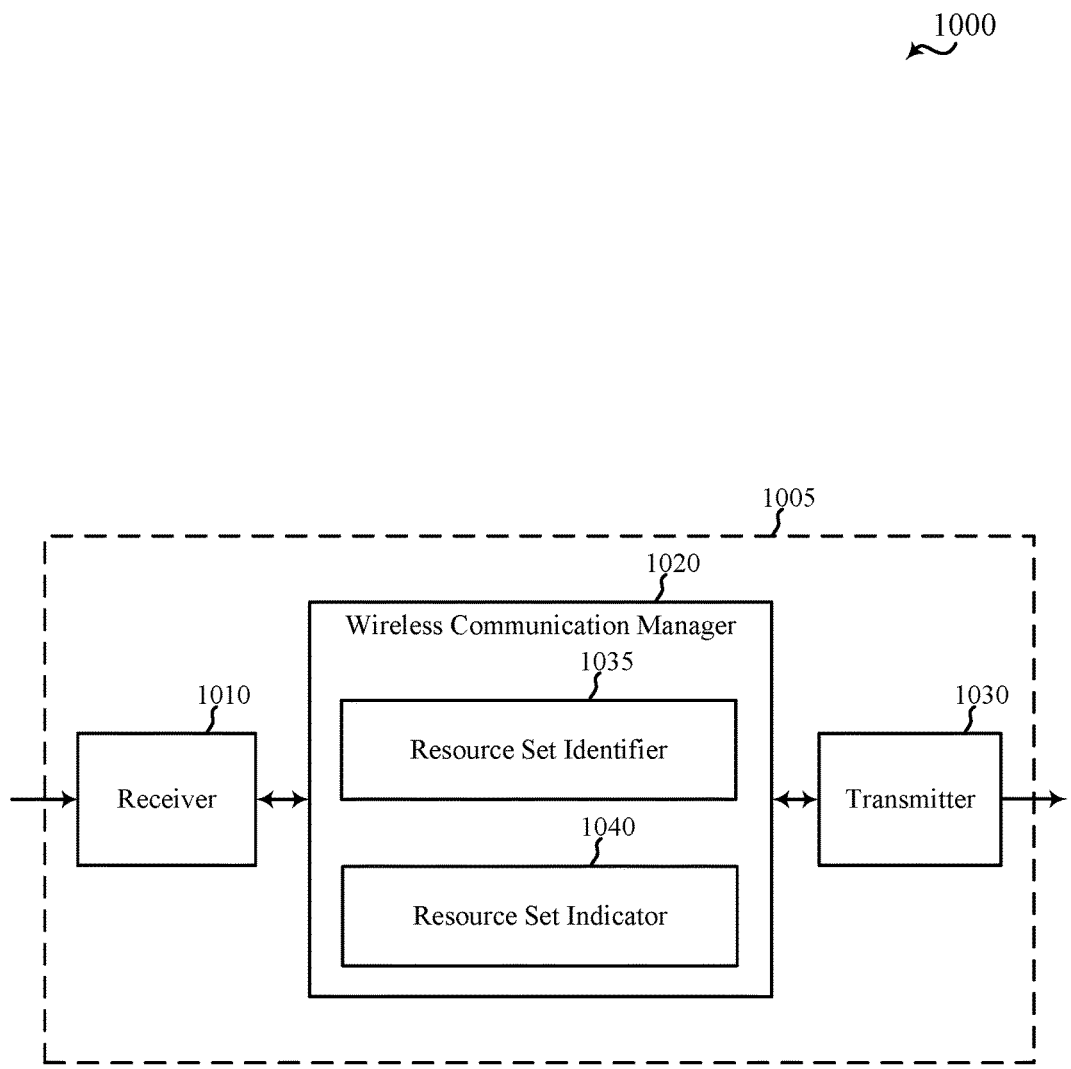
FIG. 10 shows a block diagram of an apparatus for use in wireless communication by a first device, in accordance with various aspects of the present disclosure.

FIG. 10 shows a block diagram 1000 of an apparatus 1005 for use in wireless communication by a first device, in accordance with various aspects of the present disclosure. The apparatus 1005 may be an example of aspects of one or more of the base stations 105, 205, 205-*a*, 305, or 305-*a* as described with reference to FIG. 1, 2, or 3, aspects of one or more of the UEs 115, 215, 215-*a*, 215-*b*, 315, or 315-*a* as described with reference to FIG. 1, 2, or 3, or aspects of one or more of the devices 405, 410, 415, 505, 510, or 515 as described with reference to FIG. 4 or 5. The apparatus 1005 may also be or include a processor. The apparatus 1005 may include a receiver 1010, a wireless communication manager 1020, or a transmitter 1030. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one RF receiver, such as at least one RF receiver operable to receive transmissions over a radio frequency spectrum band dedicated for use by devices associated with a first operator (which devices may include the first device and the apparatus 1005), or over a radio frequency spectrum band shared by the devices associated with the first operator and devices associated with a second operator. In some examples, the dedicated radio frequency spectrum band or the shared radio frequency spectrum band may be used for LTE/LTE-A communications, as described, for example, with reference to FIG. 1, 2, 3, 4, 5, 6, or 7. In some examples, the receiver 1010 may include at least one receiver for receiving transmissions over a wired communication link. The receiver 1010 may be used to receive various types of data or control signals or information (i.e., "transmissions") over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the transmitter 1030 may include at least one RF transmitter, such as at least one RF transmitter operable to transmit over the dedicated radio frequency spectrum band or the shared radio frequency spectrum band. In some examples, the transmitter 1030 may include at least one transmitter for transmitting over a wired communication link. The transmitter 1030 may be used to transmit various types of data or control signals or information (i.e., "transmissions") over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the wireless communication manager 1020 may be used to manage one or more aspects of wireless communication for a device (e.g., a first device) including the apparatus 1005 or one or more other devices. In some examples, part of the wireless communication manager 1020 may be incorporated into or shared with the receiver 1010 or the transmitter 1030. In some examples, the wireless communication manager 1020 may include a resource set identifier 1035 or a resource set indicator 1040.

The resource set identifier 1035 may be used to identify a first resource set, a second resource set, and a third resource set in a radio frequency spectrum band. In some examples, the radio frequency spectrum band may be shared by devices associated with a first operator and devices associated with a second operator. The first resource set, the second resource set, and the third resource set may be respectively associated with a first restriction level for resource usage, a second restriction level for resource usage, and a third restriction level for resource usage. In some examples, identifying the first resource set, the second resource set, and the third resource set may include defining the first resource set, the second resource set, and the third resource set and/or the associations between the first resource set, the second resource set, and the third resource set and the first restriction level for resource usage, the second restriction level for resource usage, and the third restriction level for resource usage. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the first device may be associated with a first operator, and the second restriction level for resources usage may include a prohibition of resource usage by devices associated with the first operator and an exclusive resource usage by devices associated with a second operator. In some examples, the contention-based resource usage by the second set of devices may include one or more thresholds for determining whether resources in the third resource set are cleared for usage by the second set of devices. In some examples, identifying the first resource set, the second resource set, and the third resource set may include defining the one or more thresholds for determining whether resources in the third resource set are cleared for usage by the second set of devices.

In some examples, identifying the first resource set, the second resource set, and the third resource set may include defining the first resource set, the second resource set, and the third resource set based at least in part on: TDM, FDM, SDM, or a combination thereof. In some examples, identifying the first resource set, the second resource set, and the third resource set may include associating each of the first resource set, the second resource set, and the third resource set with at least one of: uplink use, downlink use, or a combination thereof. In some examples, the first resource set, the second resource set, and the third resource set may be identified based at least in part on: a wired communication link, a wireless communication link, or a combination thereof.

The resource set indicator 1040 may be used to transmit an indication of at least one resource set of the first resource set, the second resource set, or the third resource set to a second device.

Figure 11:
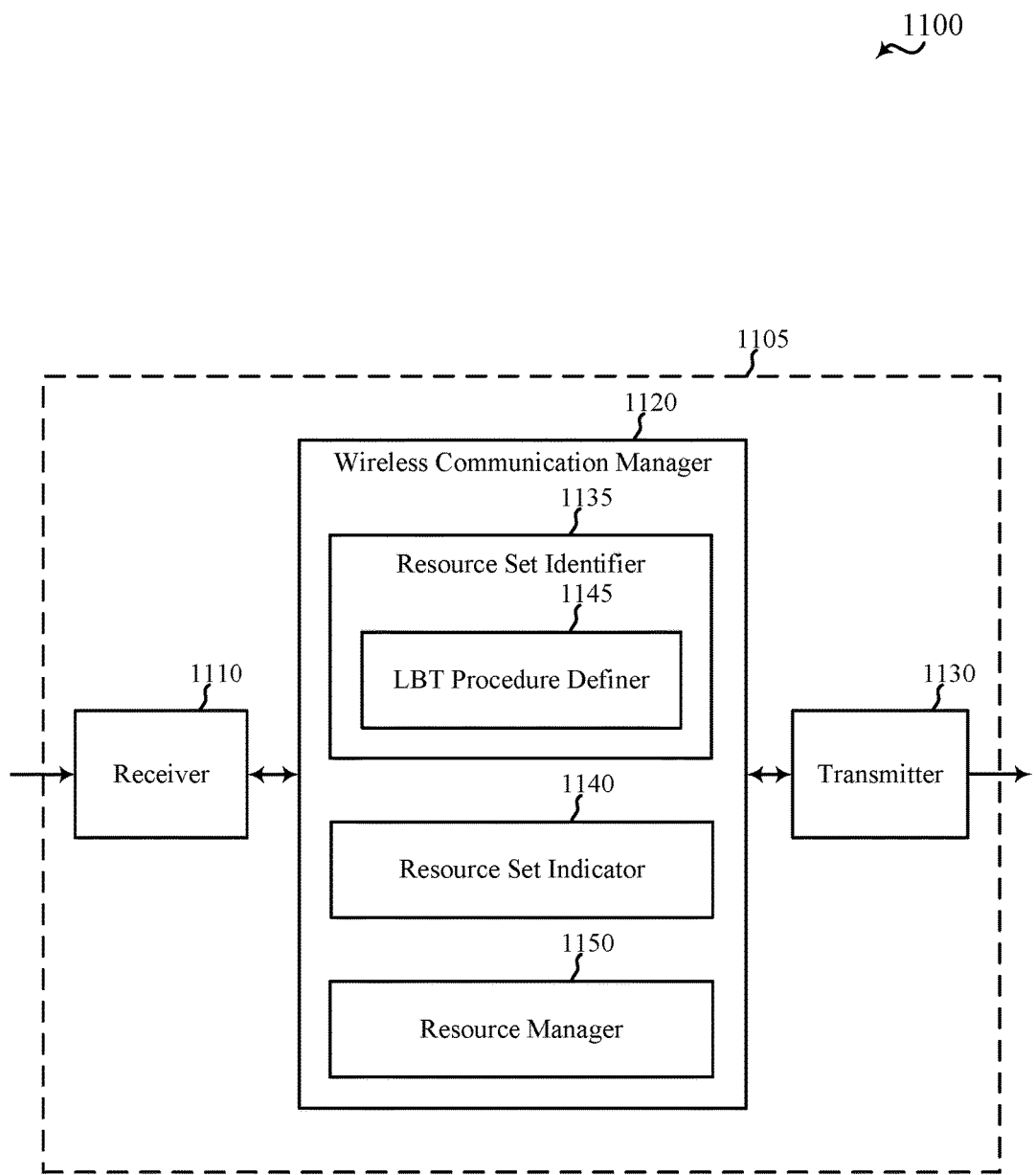
FIG. 11 shows a block diagram of an apparatus for use in wireless communication by a first device, in accordance with various aspects of the present disclosure.

FIG. 11 shows a block diagram 1100 of an apparatus 1105 for use in wireless communication by a first device, in accordance with various aspects of the present disclosure. The apparatus 1105 may be an example of aspects of one or more of the base stations 105, 205, 205-a, 305, or 305-a as described with reference to FIG. 1, 2, or 3, aspects of one or more of the UEs 115, 215, 215-a, 215-b, 315, or 315-a as described with reference to FIG. 1, 2, or 3, aspects of one or more of the devices 405, 410, 415, 505, 510, or 515 as described with reference to FIG. 4 or 5, or aspects of the apparatus 1005 as described with reference to FIG. 10. The apparatus 1105 may also be or include a processor. The apparatus 1105 may include a receiver 1110, a wireless communication manager 1120, or a transmitter 1130. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1110 may include at least one RF receiver, such as at least one RF receiver operable to receive transmissions over a radio frequency spectrum band dedicated for use by devices associated with a first operator (which devices may include the first device and the apparatus 1105), or over a radio frequency spectrum band shared by the devices associated with the first operator and devices associated with a second operator. In some examples, the dedicated radio frequency spectrum band or the shared radio frequency spectrum band may be used for LTE/LTE-A communications, as described, for example, with reference to FIG. 1, 2, 3, 4, 5, 6, or 7. In some examples, the receiver 1110 may include at least one receiver for receiving transmissions over a wired communication link. The receiver 1110 may be used to receive various types of data or control signals or information (i.e., "transmissions") over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the transmitter 1130 may include at least one RF transmitter, such as at least one RF transmitter operable to transmit over the dedicated radio frequency spectrum band or the shared radio frequency spectrum band. In some examples, the transmitter 1130 may include at least one transmitter for transmitting over a wired communication link. The transmitter 1130 may be used to transmit various types of data or control signals or information (i.e., "transmissions") over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the wireless communication manager 1120 may be used to manage one or more aspects of wireless communication for a device (e.g., a first device) including the apparatus 1105 or one or more other devices. In some examples, part of the wireless communication manager 1120 may be incorporated into or shared with the receiver 1110 or the transmitter 1130. In some examples, the wireless communication manager 1120 may include a resource set identifier 1135, a resource set indicator 1140, or a resource manager 1150. In some examples, the resource set identifier 1135 may include a LBT procedure definer 1145.

In some examples, the resource set identifier 1135 may optionally be used to identify, determine, or receive information indicating: a first distribution of devices associated with a first operator, a second distribution of devices associated with a second operator, a first service configuration of devices associated with the first operator, a second service configuration of devices associated with the second operator, a first amount of uplink traffic of devices associated with the first operator, a second amount of uplink traffic of devices associated with the second operator, a first amount of downlink traffic of devices associated with the first operator, a second amount of downlink traffic of devices associated with the second operator, a first fee paid by the first operator, a second fee paid by the second operator, or a combination thereof.

The resource set identifier 1135 may also be used to identify a first resource set, a second resource set, and a third resource set in a radio frequency spectrum band. In some examples, the radio frequency spectrum band may be shared by devices associated with the first operator and devices associated with the second operator. The first resource set, the second resource set, and the third resource set may be respectively associated with a first restriction level for resource usage, a second restriction level for resource usage, and a third restriction level for resource usage. In some examples, identifying the first resource set, the second resource set, and the third resource set may include defining the first resource set, the second resource set, and the third resource set and/or the associations between the first resource set, the second resource set, and the third resource set and the first restriction level for resource usage, the second restriction level for resource usage, and the third restriction level for resource usage. In some examples, the first resource set, the second resource set, and the third resource set, and the associations between the first resource set, the second resource set, and the third resource set and the first restriction level for resource usage, the second restriction level for resource usage, and the third restriction level for resource usage, may be defined based at least in part on information identified, determined, or received by the resource set identifier 1135. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the first device may be associated with a first operator, and the second restriction level for resources usage may include a prohibition of resource usage by devices associated with the first operator and an exclusive resource usage by devices associated with a second operator. In some examples, the contention-based resource usage by the second set of devices may include one or more thresholds for determining whether resources in the third resource set are cleared for usage by the second set of devices. In some examples, identifying the first resource set, the second resource set, and the third resource set may include defining the one or more thresholds for determining whether resources in the third resource set are cleared for usage by the second set of devices.

In some examples, identifying the first resource set, the second resource set, and the third resource set may include defining the first resource set, the second resource set, and the third resource set based at least in part on: TDM, FDM, SDM, or a combination thereof. In some examples, identifying the first resource set, the second resource set, and the third resource set may include associating each of the first resource set, the second resource set, and the third resource set with at least one of: uplink use, downlink use, or a combination thereof. In some examples, the first resource set, the second resource set, and the third resource set may be identified based at least in part on: a wired communication link, a wireless communication link, or a combination thereof.

In some examples, the resource set identifier 1135 may define a first partition of resources for the first resource set, the second resource set, and the third resource set at a first time instance, and define a second partition of resources for the first resource set, the second resource set, and the third resource set at a second time instance.

The LBT procedure definer 1145 may be used to define a first LBT procedure to be performed by devices associated with a first operator before accessing the third resource set, and define a second LBT procedure to be performed by devices associated with a second operator before accessing the third resource set. The first LBT procedure and the second LBT procedure may provide different contention for access thresholds.

The resource set indicator 1140 may be used to transmit an indication of at least one resource set of the first resource set, the second resource set, or the third resource set to a second device.

The resource manager 1150 may be used to operate at least one aspect of the first resource set and the third resource set jointly, or alternatively, separately. In some examples, the at least one jointly or separately operated aspect of the first resource set and the third resource set may include: a HARQ process, a power control parameter, or a combination thereof.

In some examples, aspects of the apparatuses 1005 and 1105 as described with reference to FIGS. 10 and 11 may be combined.

Figure 12:
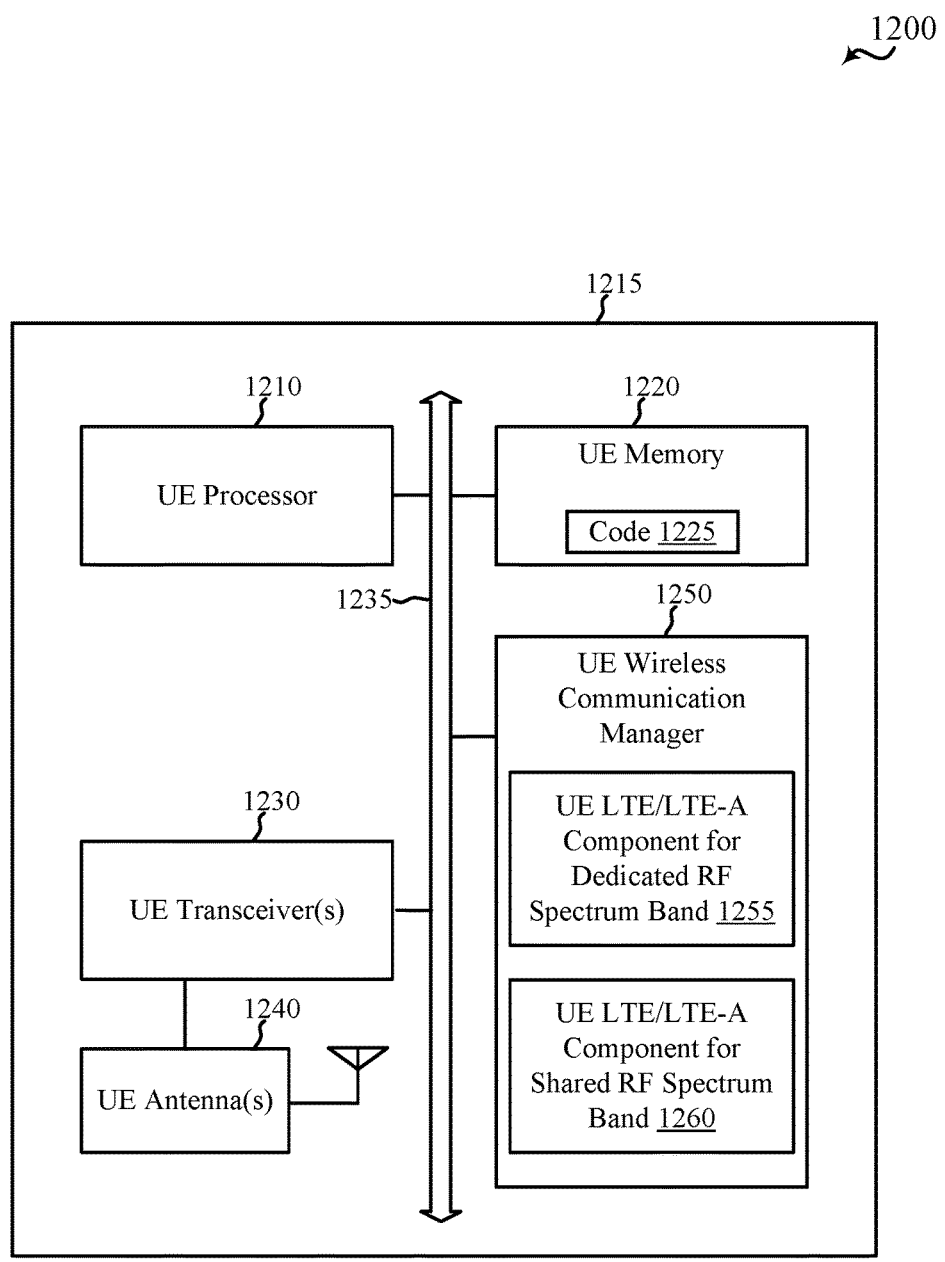
FIG. 12 shows a block diagram of a UE for use in wireless communication, in accordance with various aspects of the present disclosure.

FIG. 12 shows a block diagram 1200 of a UE 1215 for use in wireless communication, in accordance with various aspects of the present disclosure. The UE 1215 may be included or be part of a personal computer (e.g., a laptop computer, a netbook computer, a tablet computer, etc.), a cellular telephone, a PDA, a DVR, an internet appliance, a gaming console, an e-reader, etc. The UE 1215 may, in some examples, have an internal power supply (not shown), such as a small battery, to facilitate mobile operation. In some examples, the UE 1215 may be an example of aspects of one or more of the UEs 115, 215, 215-*a*, 215-*b*, 315, or 315-*a* as described with reference to FIG. 1, 2, or 3, aspects of one or more of the devices 405, 410, 415, 505, 510, or 515 as described with reference to FIG. 4 or 5, or aspects of one or more of the apparatuses 805, 905, 1005, or 1105 as described with reference to FIG. 8, 9, 10, or 11. The UE 1215 may be configured to implement at least some of the UE, device, or apparatus techniques and functions as described with reference to FIG. 1, 2, 3, 4, 5, 6, 7, 8, 9, 10, or 11.

The UE 1215 may include a UE processor 1210, a UE memory 1220, at least one UE transceiver (represented by UE transceiver(s) 1230), at least one UE antenna (represented by UE antenna(s) 1240), or a UE wireless communication manager 1250. Each of these components may be in communication with each other, directly or indirectly, over one or more buses 1235.

The UE memory 1220 may include random access memory (RAM) or read-only memory (ROM). The UE memory 1220 may store computer-readable, computer-executable code 1225 containing instructions that are configured to, when executed, cause the UE processor 1210 to perform various functions described herein related to wireless communication, including, for example, identifying a plurality of resource sets associated with different restriction levels for usage in a radio frequency spectrum band, and communicating with another device using at least one of the resource sets and/or indicating at least one of the resource sets to another device. Alternatively, the computer-executable code 1225 may not be directly executable by the UE processor 1210 but be configured to cause the UE 1215 (e.g., when compiled and executed) to perform various functions described herein.

The UE processor 1210 may include an intelligent hardware device, e.g., a central processing unit (CPU), a microcontroller, an ASIC, etc. The UE processor 1210 may process information received through the UE transceiver(s) 1230 or information to be sent to the UE transceiver(s) 1230 for transmission through the UE antenna(s) 1240. The UE processor 1210 may handle, alone or in connection with the UE wireless communication manager 1250, various aspects of communicating over (or managing communications over) a dedicated radio frequency spectrum band or a shared radio frequency spectrum band.

The UE transceiver(s) 1230 may include a modem configured to modulate packets and provide the modulated packets to the UE antenna(s) 1240 for transmission, and to demodulate packets received from the UE antenna(s) 1240. The UE transceiver(s) 1230 may, in some examples, be implemented as one or more UE transmitters and one or more separate UE receivers. The UE transceiver(s) 1230 may support communications in a dedicated radio frequency spectrum band or a shared radio frequency spectrum band. The UE transceiver(s) 1230 may be configured to communicate bi-directionally, via the UE antenna(s) 1240, with one or more network access devices, base stations, devices, or apparatuses, such as one or more of the network access devices or base stations 105, 205, 205-*a*, 305, or 305-*a* as described with reference to FIG. 1, 2, or 3, one or more of the devices 405, 410, 415, 505, 510, or 515 as described with reference to FIG. 4 or 5, or one or more of the apparatuses 805, 905, 1005, or 1105 as described with reference to FIG. 8, 9, 10, or 11. While the UE 1215 may include a single UE antenna, there may be examples in which the UE 1215 may include multiple UE antennas 1240.

The UE wireless communication manager 1250 may be configured to perform or control some or all of the UE, device, or apparatus techniques or functions as described with reference to FIG. 1, 2, 3, 4, 5, 6, 7, 8, 9, 10, or 11 related to wireless communication over a dedicated radio frequency spectrum band or a shared radio frequency spectrum band. The UE wireless communication manager 1250 may include a UE LTE/LTE-A component for dedicated RF spectrum band 1255 configured to handle LTE/LTE-A communications in a dedicated radio frequency spectrum band and/or a UE LTE/LTE-A component for shared RF spectrum band 1260 configured to handle LTE/LTE-A communications in a shared radio frequency spectrum band. The UE wireless communication manager 1250, or portions of it, may include a processor, or some or all of the functions of the UE wireless communication manager 1250 may be performed by the UE processor 1210 or in connection with the UE processor 1210. In some examples, the UE wireless communication manager 1250 may be an example of the wireless communication manager 820, 920, 1020, or 1120 as described with reference to FIG. 8, 9, 10, or 11.

Figure 13:
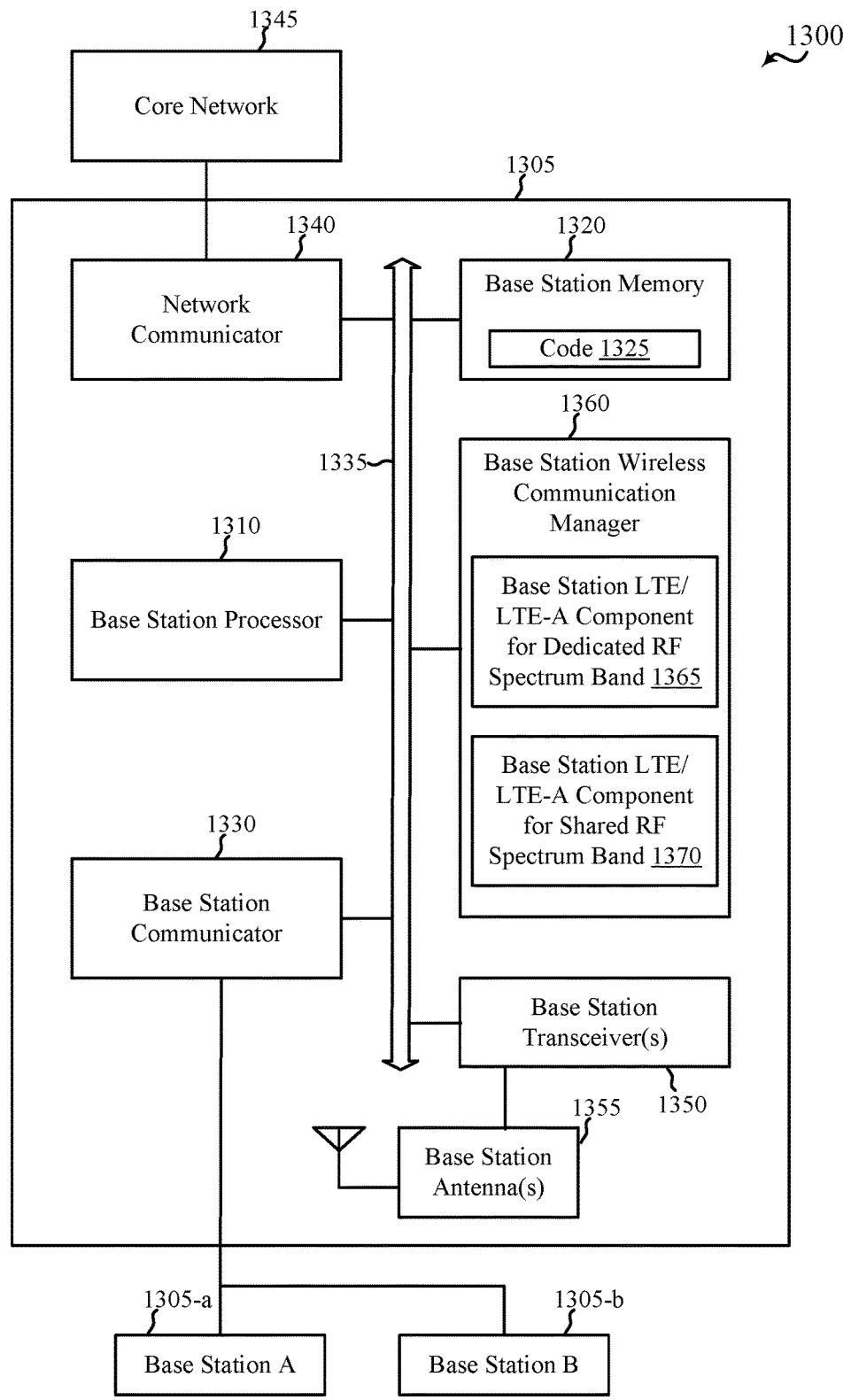
FIG. 13 shows a block diagram of a base station for use in wireless communication, in accordance with various aspects of the present disclosure.

FIG. 13 shows a block diagram 1300 of a base station 1305 for use in wireless communication, in accordance with various aspects of the present disclosure. In some examples, the base station 1305 may be an example of one or more aspects of the base stations 105, 205, 205-*a*, 305, or 305-*a* as described with reference to FIG. 1, 2, or 3, aspects of one or more of the devices 405, 410, 415, 505, 510, or 515 as described with reference to FIG. 4 or 5, or aspects of one or more of the apparatuses 805, 905, 1005, or 1105 as described with reference to FIG. 8, 9, 10, or 11. The base station 1305 may be configured to implement or facilitate at least some of the network device, base station, device, or apparatus techniques and functions as described with reference to FIG. 1, 2, 3, 4, 5, 6, 7, 8, 9, 10, or 11.

The base station 1305 may include a base station processor 1310, a base station memory 1320, at least one base station transceiver (represented by base station transceiver(s) 1350), at least one base station antenna (represented by base station antenna(s) 1355), or a base station wireless communication manager 1360. The base station 1305 may also include one or more of a base station communicator 1330 or a network communicator 1340. Each of these components may be in communication with each other, directly or indirectly, over one or more buses 1335.

The base station memory 1320 may include RAM or ROM. The base station memory 1320 may store computer-readable, computer-executable code 1325 containing instructions that are configured to, when executed, cause the base station processor 1310 to perform various functions described herein related to wireless communication, including, for example, identifying a plurality of resource sets associated with different restriction levels for usage in a radio frequency spectrum band, and communicating with another device using at least one of the resource sets and/or indicating at least one of the resource sets to another device. Alternatively, the computer-executable code 1325 may not be directly executable by the base station processor 1310 but be configured to cause the base station 1305 (e.g., when compiled and executed) to perform various functions described herein.

The base station processor 1310 may include an intelligent hardware device, e.g., a CPU, a microcontroller, an ASIC, etc. The base station processor 1310 may process information received through the base station transceiver(s) 1350, the base station communicator 1330, or the network communicator 1340. The base station processor 1310 may also process information to be sent to the transceiver(s) 1350 for transmission through the antenna(s) 1355, to the base station communicator 1330, for transmission to one or more other base stations (e.g., base station 1305-*a* and/or base station 1305-*b*), or to the network communicator 1340 for transmission to a core network 1345, which may be an example of one or more aspects of the core network 130 as described with reference to FIG. 1. The base station processor 1310 may handle, alone or in connection with the base station wireless communication manager 1360, various aspects of communicating over (or managing communications over) a dedicated radio frequency spectrum band or a shared radio frequency spectrum band.

The base station transceiver(s) 1350 may include a modem configured to modulate packets and provide the modulated packets to the base station antenna(s) 1355 for transmission, and to demodulate packets received from the base station antenna(s) 1355. The base station transceiver(s) 1350 may, in some examples, be implemented as one or more base station transmitters and one or more separate base station receivers. The base station transceiver(s) 1350 may support communications in a dedicated radio frequency spectrum band or a shared radio frequency spectrum band. The base station transceiver(s) 1350 may be configured to communicate bi-directionally, via the base station antenna(s) 1355, with one or more UEs, devices, or apparatuses, such as one or more of the UEs 115, 215, 215-*a*, 215-*b*, 315, 315-*a*, or 1215 as described with reference to FIG. 1, 2, 3, or 12, one or more of the devices 405, 410, 415, 505, 510, or 515 as described with reference to FIG. 4 or 5, or one or more of the apparatuses 805, 905, 1005, or 1105 as described with reference to FIG. 8, 9, 10, or 11. The base station 1305 may, for example, include multiple base station antennas 1355 (e.g., an antenna array). The base station 1305 may communicate with the core network 1345 through the network communicator 1340. The base station 1305 may also communicate with other base stations, such as the base station 1305-*a* and/or the base station 1305-*b*, using the base station communicator 1330.

The base station wireless communication manager 1360 may be configured to perform or control some or all of the network access device, base station, device, or apparatus techniques or functions as described with reference to FIG. 1, 2, 3, 4, 5, 6, 7, 8, 9, 10, or 11 related to wireless communication over a dedicated radio frequency spectrum band or a shared radio frequency spectrum band. The base station wireless communication manager 1360 may include a base station LTE/LTE-A component for dedicated RF spectrum band 1365 configured to handle LTE/LTE-A communications in a dedicated radio frequency spectrum band and/or a base station LTE/LTE-A component for shared RF spectrum band 1370 configured to handle LTE/LTE-A communications in a shared radio frequency spectrum band. The base station wireless communication manager 1360, or portions of it, may include a processor, or some or all of the functions of the base station wireless communication manager 1360 may be performed by the base station processor 1310 or in connection with the base station processor 1310. In some examples, the base station wireless communication manager 1360 may be an example of the wireless communication manager 820, 920, 1020, or 1120 as described with reference to FIG. 8, 9, 10, or 11.

Figure 14:
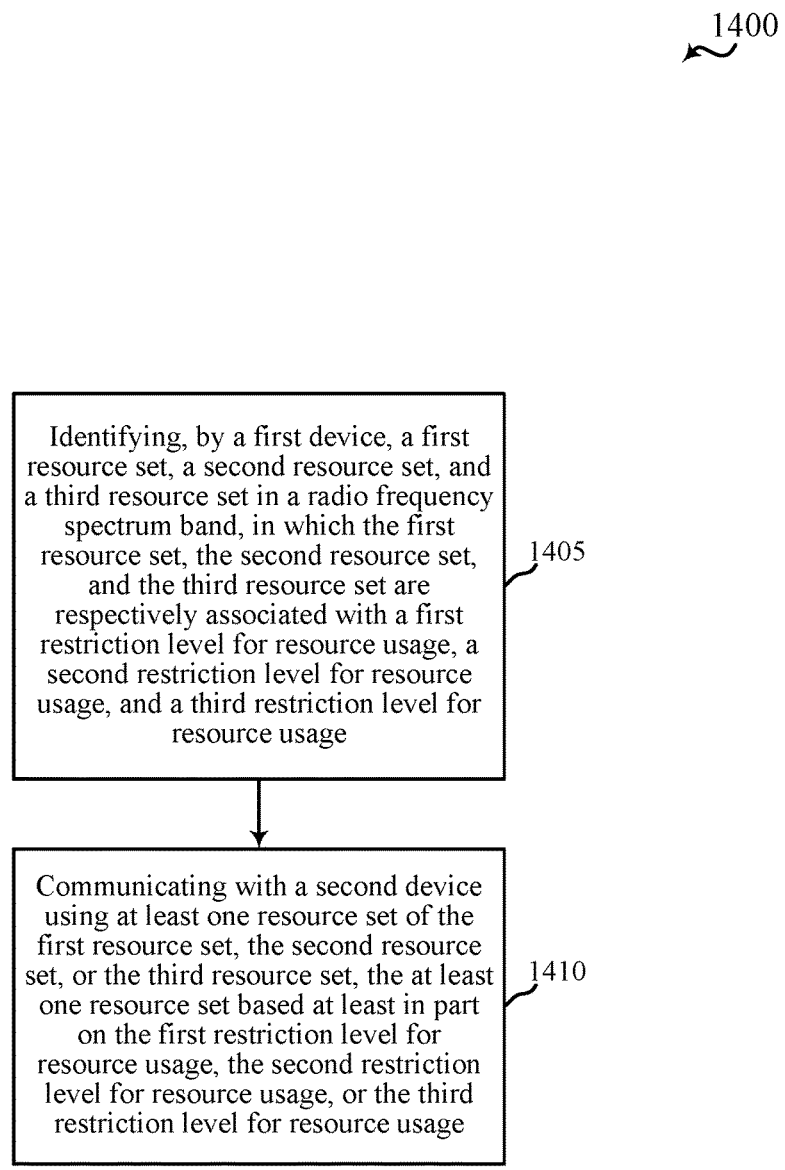
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to a device including aspects of one or more of the base stations 105, 205, 205-a, 305, 305-a, or 1305 as described with reference to FIG. 1, 2, 3, or 13, aspects of one or more of the UEs 115, 215, 215-a, 215-b, 315, 315-a, or 1215 as described with reference to FIG. 1, 2, 3, or 12, aspects of one or more of the devices 405, 410, 415, 505, 510, or 515 as described with reference to FIG. 4 or 5, or aspects of one or more of the apparatuses 805 or 905 as described with reference to FIG. 8 or 9. In some examples, a device may execute one or more sets of codes to control the functional elements of the device to perform the functions described below. Additionally or alternatively, the device may perform one or more of the functions described below using special-purpose hardware.

At block 1405, the method 1400 may include identifying, by a first device, a first resource set, a second resource set, and a third resource set in a radio frequency spectrum band. In some examples, the radio frequency spectrum band may be shared by devices associated with a first operator and devices associated with a second operator. The first resource set, the second resource set, and the third resource set may be respectively associated with a first restriction level for resource usage, a second restriction level for resource usage, and a third restriction level for resource usage. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the first device may be associated with a first operator, and the second restriction level for resources usage may include a prohibition of resource usage by devices associated with the first operator and an exclusive resource usage by devices associated with a second operator. In some examples, the contention-based resource usage by the second set of devices may include one or more thresholds for determining whether resources in the third resource set are cleared for usage by the second set of devices.

In some examples, the first resource set, the second resource set, and the third resource set may be identified based at least in part on: TDM, FDM, SDM, or a combination thereof. In some examples, each of the first resource set, the second resource set, and the third resource set may be associated with at least one of: uplink use, downlink use, or a combination thereof. In some examples, the first resource set, the second resource set, and the third resource set may be identified based at least in part on: a wired communication link, a wireless communication link, or a combination thereof.

In some examples, the operation(s) at block 1405 may include identifying a first LBT procedure to be performed by devices associated with a first operator before accessing the third resource set, and identifying a second LBT procedure to be performed by devices associated with a second operator before accessing the third resource set. The first LBT procedure and the second LBT procedure may provide different contention for access thresholds.

The operation(s) at block 1405 may be performed using the wireless communication manager 820 or 920 as described with reference to FIG. 8 or 9, the UE wireless communication manager 1250 as described with reference to FIG. 12, the base station wireless communication manager 1360 as described with reference to FIG. 13, or the resource set identifier 835 or 935 as described with reference to FIG. 8 or 9. LBT procedures may be identified using the wireless communication manager 820 or 920 as described with reference to FIG. 8 or 9, the UE wireless communication manager 1250 described with reference to FIG. 12, the base station wireless communication manager 1360 as described with reference to FIG. 13, or the LBT procedure identifier 945 as described with reference to FIG. 9.

At block 1410, the method 1400 may include communicating with a second device using at least one resource set of the first resource set, the second resource set, or the third resource set. The at least one resource set may be based at least in part on the first restriction level for resource usage, the second restriction level for resource usage, or the third restriction level for resource usage. The operation(s) at block 1410 may be performed using the wireless communication manager 820 or 920 as described with reference to FIG. 8 or 9, the UE wireless communication manager 1250 as described with reference to FIG. 12, the base station wireless communication manager 1360 as described with reference to FIG. 13, or the shared RF spectrum band communication manager 840 or 940 as described with reference to FIG. 8 or 9.

Figure 15:
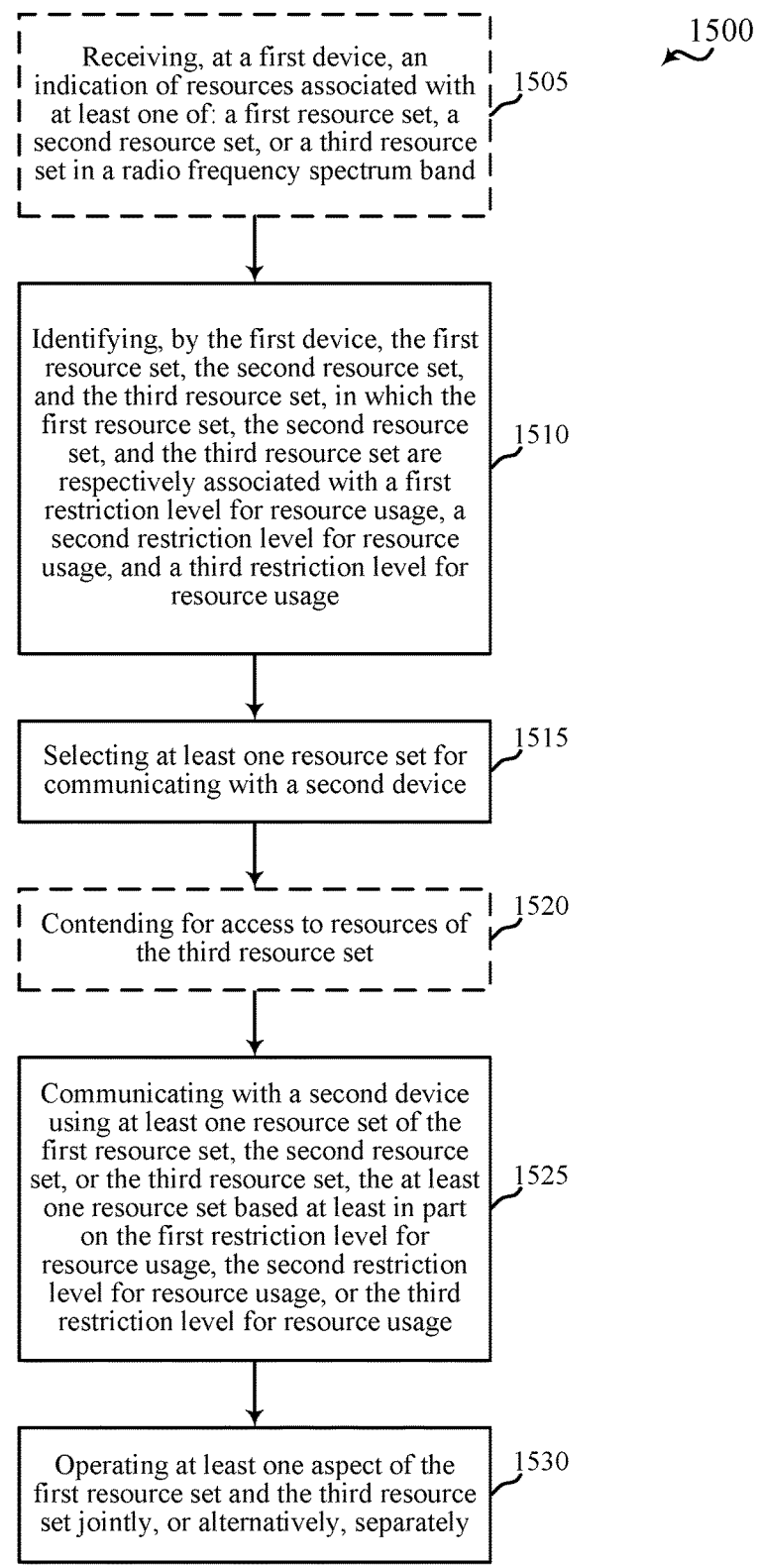
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to a device including aspects of one or more of the base stations 105, 205, 205-a, 305, 305-a, or 1305 as described with reference to FIG. 1, 2, 3, or 13, aspects of one or more of the UEs 115, 215, 215-a, 215-b, 315, 315-a, or 1215 as described with reference to FIG. 1, 2, 3, or 12, aspects of one or more of the devices 405, 410, 415, 505, 510, or 515 as described with reference to FIG. 4 or 5, or aspects of one or more of the apparatuses 805 or 905 as described with reference to FIG. 8 or 9. In some examples, a device may execute one or more sets of codes to control the functional elements of the device to perform the functions described below. Additionally or alternatively, the device may perform one or more of the functions described below using special-purpose hardware.

At block 1505, the method 1500 may optionally include receiving, at a first device, an indication of resources associated with at least one of: a first resource set, a second resource set, or a third resource set in a radio frequency spectrum band. In some examples, the radio frequency spectrum band may be shared by devices associated with a first operator and devices associated with a second operator. The operation(s) at block 1505 may be performed using the wireless communication manager 820 or 920 as described with reference to FIG. 8 or 9, the UE wireless communication manager 1250 described with reference to FIG. 12, the base station wireless communication manager 1360 as described with reference to FIG. 13, or the resource set identifier 835 or 935 as described with reference to FIG. 8 or 9.

At block 1510, the method 1500 may include identifying, by the first device, the first resource set, the second resource set, and the third resource set in the radio frequency spectrum band. The first resource set, the second resource set, and the third resource set may be respectively associated with a first restriction level for resource usage, a second restriction level for resource usage, and a third restriction level for resource usage. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the first device may be associated with a first operator, and the second restriction level for resources usage may include a prohibition of resource usage by devices associated with the first operator and an exclusive resource usage by devices associated with a second operator. In some examples, the contention-based resource usage by the second set of devices may include one or more thresholds for determining whether resources in the third resource set are cleared for usage by the second set of devices.

In some examples, the first resource set, the second resource set, and the third resource set may be identified based at least in part on: TDM, FDM, SDM, or a combination thereof. In some examples, each of the first resource set, the second resource set, and the third resource set may be associated with at least one of: uplink use, downlink use, or a combination thereof. In some examples, the first resource set, the second resource set, and the third resource set may be identified based at least in part on: a wired communication link, a wireless communication link, or a combination thereof.

In some examples, the operation(s) at block 1510 may include identifying a first LBT procedure to be performed by devices associated with a first operator before accessing the third resource set, and identifying a second LBT procedure to be performed by devices associated with a second operator before accessing the third resource set. The first LBT procedure and the second LBT procedure may provide different contention for access thresholds.

The operation(s) at block 1510 may be performed using the wireless communication manager 820 or 920 as described with reference to FIG. 8 or 9, the UE wireless communication manager 1250 as described with reference to FIG. 12, the base station wireless communication manager 1360 as described with reference to FIG. 13, or the resource set identifier 835 or 935 as described with reference to FIG. 8 or 9. LBT procedures may be identified using the wireless communication manager 820 or 920 as described with reference to FIG. 8 or 9, the UE wireless communication manager 1250 as described with reference to FIG. 12, the base station wireless communication manager 1360 as described with reference to FIG. 13, or the LBT procedure identifier 945 as described with reference to FIG. 9.

At block 1515, the method 1500 may include selecting at least one resource set for communicating with a second device. The at least one resource set may be selected from the first resource set, the second resource set, or the third resource set. The selection of the at least one resource set may be based at least in part on the first restriction level for resource usage, the second restriction level for resource usage, or the third restriction level for resource usage. In some examples, the at least one resource set for communicating with the second device may be selected based at least in part on: an operator associated with the first device, a characteristic of the communication, or a combination thereof. In some examples, the characteristic of the communication may be based at least in part on: the communication being associated with a QoS satisfying a threshold QoS, the communication comprising a type of control communication, the communication comprising a type of signaling, the communication comprising a type of synchronization signal, the communication being a broadcast communication type, the communication being associated with time tracking, the communication being associated with frequency tracking, the communication being associated with measurement or discovery of cells, or a combination thereof. The operation(s) at block 1515 may be performed using the wireless communication manager 820 or 920 as described with reference to FIG. 8 or 9, the UE wireless communication manager 1250 described with reference to FIG. 12, the base station wireless communication manager 1360 as described with reference to FIG. 13, or the resource set selector 950 as described with reference to FIG. 9.

At block 1520, and when the third resource set is selected at block 1515, the method 1500 may include contending for access to resources of the third resource set. When the contention for access is successful, the resources of the third resource set may be used for communication at block 1525. When the contention for access is not successful, the resources of the third resource set may not be used for communication at block 1525. The operation(s) at block 1520 may be performed using the wireless communication manager 820 or 920 as described with reference to FIG. 8 or 9, the UE wireless communication manager 1250 described with reference to FIG. 12, the base station wireless communication manager 1360 as described with reference to FIG. 13, or the resource contention manager 955 as described with reference to FIG. 9.

At block 1525, the method 1500 may include communicating with the second device using the at least one resource set selected at block 1515. The operation(s) at block 1525 may be performed using the wireless communication manager 820 or 920 as described with reference to FIG. 8 or 9, the UE wireless communication manager 1250 described with reference to FIG. 12, the base station wireless communication manager 1360 as described with reference to FIG. 13, or the shared RF spectrum band communication manager 840 or 940 as described with reference to FIG. 8 or 9.

At block 1530, the method 1500 may include operating at least one aspect of the first resource set and the third resource set jointly, or alternatively, separately. In some examples, the at least one jointly or separately operated aspect of the first resource set and the third resource set may include: a HARQ process, a power control parameter, or a combination thereof. The operation(s) at block 1530 may be performed using the wireless communication manager 820 or 920 as described with reference to FIG. 8 or 9, the UE wireless communication manager 1250 as described with reference to FIG. 12, the base station wireless communication manager 1360 as described with reference to FIG. 13, or the resource manager 960 as described with reference to FIG. 9.

In some examples, the method 1500 may include determining a first partition of resources for the first resource set, the second resource set, and the third resource set at a first time instance, and determining a second partition of resources for the first resource set, the second resource set, and the third resource set at a second time instance.

In some examples, aspects of the methods 1400 and 1500 as described with reference to FIGS. 14 and 15 may be combined.

Figure 16:
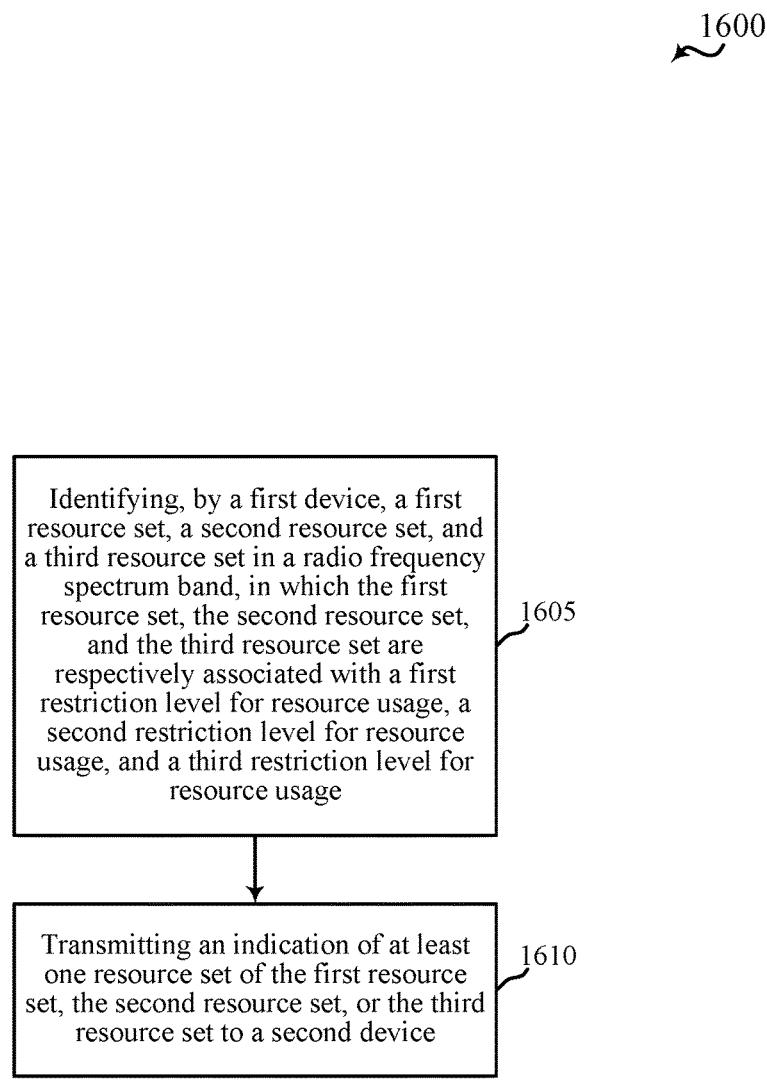
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to a device including aspects of one or more of the base stations 105, 205, 205-*a*, 305, 305-*a*, or 1305 as described with reference to FIG. 1, 2, 3, or 13, aspects of one or more of the UEs 115, 215, 215-*a*, 215-*b*, 315, 315-*a*, or 1215 as described with reference to FIG. 1, 2, 3, or 12, aspects of one or more of the devices 405, 410, 415, 505, 510, or 515 as described with reference to FIG. 4 or 5, or aspects of one or more of the apparatuses 1005 or 1105 as described with reference to FIG. 10 or 11. In some examples, a device may execute one or more sets of codes to control the functional elements of the device to perform the functions described below. Additionally or alternatively, the device may perform one or more of the functions described below using special-purpose hardware.

At block 1605, the method 1600 may include identifying, by a first device, a first resource set, a second resource set, and a third resource set in a radio frequency spectrum band. In some examples, the radio frequency spectrum band may be shared by devices associated with a first operator and devices associated with a second operator. The first resource set, the second resource set, and the third resource set may be respectively associated with a first restriction level for resource usage, a second restriction level for resource usage, and a third restriction level for resource usage. In some examples, identifying the first resource set, the second resource set, and the third resource set may include defining the first resource set, the second resource set, and the third resource set and/or the associations between the first resource set, the second resource set, and the third resource set and the first restriction level for resource usage, the second restriction level for resource usage, and the third restriction level for resource usage. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the first device may be associated with a first operator, and the second restriction level for resources usage may include a prohibition of resource usage by devices associated with the first operator and an exclusive resource usage by devices associated with a second operator. In some examples, the contention-based resource usage by the second set of devices may include one or more thresholds for determining whether resources in the third resource set are cleared for usage by the second set of devices. In some examples, identifying the first resource set, the second resource set, and the third resource set may include defining the one or more thresholds for determining whether resources in the third resource set are cleared for usage by the second set of devices.

In some examples, identifying the first resource set, the second resource set, and the third resource set may include defining the first resource set, the second resource set, and the third resource set based at least in part on: TDM, FDM, SDM, or a combination thereof. In some examples, identifying the first resource set, the second resource set, and the third resource set may include associating each of the first resource set, the second resource set, and the third resource set with at least one of: uplink use, downlink use, or a combination thereof. In some examples, the first resource set, the second resource set, and the third resource set may be identified based at least in part on: a wired communication link, a wireless communication link, or a combination thereof.

In some examples, the operation(s) at block 1605 may include defining a first LBT procedure to be performed by devices associated with a first operator before accessing the third resource set, and defining a second LBT procedure to be performed by devices associated with a second operator before accessing the third resource set. The first LBT procedure and the second LBT procedure may provide different contention for access thresholds.

The operation(s) at block 1605 may be performed using the wireless communication manager 1020 or 1120 as described with reference to FIG. 10 or 11, the UE wireless communication manager 1250 described with reference to FIG. 12, the base station wireless communication manager 1360 as described with reference to FIG. 13, or the resource set identifier 1035 or 1135 as described with reference to FIG. 10 or 11. LBT procedures may be defined using the wireless communication manager 1020 or 1120 as described with reference to FIG. 10 or 11, the UE wireless communication manager 1250 described with reference to FIG. 12, the base station wireless communication manager 1360 as described with reference to FIG. 13, or the LBT procedure definer 1145 as described with reference to FIG. 11.

At block 1610, the method 1600 may include transmitting an indication of at least one resource set of the first resource set, the second resource set, or the third resource set to a second device. The operation(s) at block 1610 may be performed using the wireless communication manager 1020 or 1120 as described with reference to FIG. 10 or 11, the UE wireless communication manager 1250 described with reference to FIG. 12, the base station wireless communication manager 1360 as described with reference to FIG. 13, or the resource set indicator 1040 or 1140 as described with reference to FIG. 10 or 11.

Figure 17:
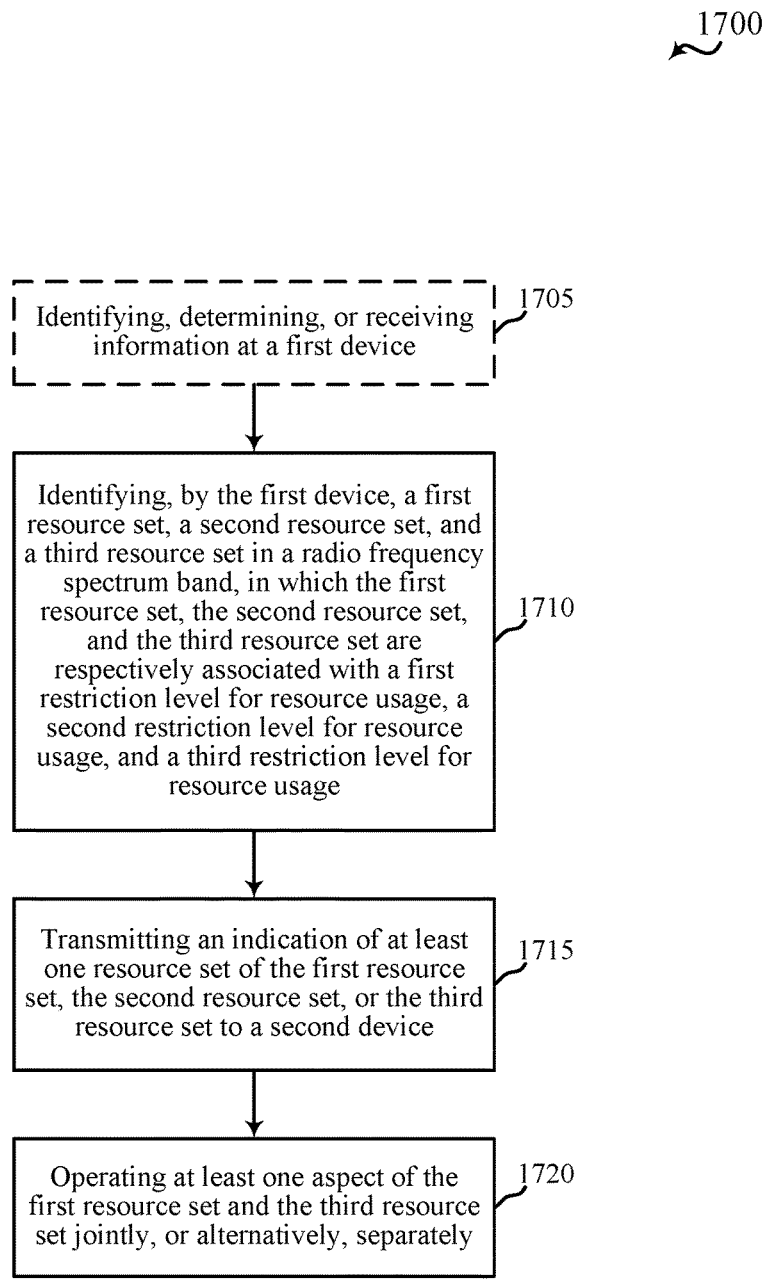
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to a device including aspects of one or more of the base stations 105, 205, 205-*a*, 305, 305-*a*, or 1305 as described with reference to FIG. 1, 2, 3, or 13, aspects of one or more of the UEs 115, 215, 215-*a*, 215-*b*, 315, 315-*a*, or 1215 as described with reference to FIG. 1, 2, 3, or 12, aspects of one or more of the devices 405, 410, 415, 505, 510, or 515 as described with reference to FIG. 4 or 5, or aspects of one or more of the apparatuses 1005 or 1105 as described with reference to FIG. 10 or 11. In some examples, a device may execute one or more sets of codes to control the functional elements of the device to perform the functions described below. Additionally or alternatively, the device may perform one or more of the functions described below using special-purpose hardware.

At block 1705, the method 1700 may optionally include identifying, determining, or receiving, at a first device, information indicating: a first distribution of devices associated with a first operator, a second distribution of devices associated with a second operator, a first service configuration of devices associated with the first operator, a second service configuration of devices associated with the second operator, a first amount of uplink traffic of devices associated with the first operator, a second amount of uplink traffic of devices associated with the second operator, a first amount of downlink traffic of devices associated with the first operator, a second amount of downlink traffic of devices associated with the second operator, a first fee paid by the first operator, a second fee paid by the second operator, or a combination thereof. The operation(s) at block 1705 may be performed using the wireless communication manager 1020 or 1120 as described with reference to FIG. 10 or 11, the UE wireless communication manager 1250 as described with reference to FIG. 12, the base station wireless communication manager 1360 as described with reference to FIG. 13, or the resource set identifier 1035 or 1135 as described with reference to FIG. 10 or 11.

At block 1710, the method 1700 may include identifying, by the first device, a first resource set, a second resource set, and a third resource set in a radio frequency spectrum band. In some examples, the radio frequency spectrum band may be shared by devices associated with the first operator and devices associated with the second operator. The first resource set, the second resource set, and the third resource set may be respectively associated with a first restriction level for resource usage, a second restriction level for resource usage, and a third restriction level for resource usage. In some examples, identifying the first resource set, the second resource set, and the third resource set may include defining the first resource set, the second resource set, and the third resource set and/or the associations between the first resource set, the second resource set, and the third resource set and the first restriction level for resource usage, the second restriction level for resource usage, and the third restriction level for resource usage. In some examples, the first resource set, the second resource set, and the third resource set, and the associations between the first resource set, the second resource set, and the third resource set and the first restriction level for resource usage, the second restriction level for resource usage, and the third restriction level for resource usage, may be defined based at least in part on the information identified, determined, or received at block 1705. In some examples, the first restriction level for resource usage may include an exclusive resource usage by a first set of devices including the first device, the second restriction level for resource usage may include a prohibition of resource usage by at least the first device, and the third restriction level for resource usage may include a contention-based resource usage by a second set of devices including the first device. In some examples, the first device may be associated with a first operator, and the second restriction level for resources usage may include a prohibition of resource usage by devices associated with the first operator and an exclusive resource usage by devices associated with a second operator. In some examples, the contention-based resource usage by the second set of devices may include one or more thresholds for determining whether resources in the third resource set are cleared for usage by the second set of devices. In some examples, identifying the first resource set, the second resource set, and the third resource set may include defining the one or more thresholds for determining whether resources in the third resource set are cleared for usage by the second set of devices.

In some examples, identifying the first resource set, the second resource set, and the third resource set may include defining the first resource set, the second resource set, and the third resource set based at least in part on: TDM, FDM, SDM, or a combination thereof. In some examples, identifying the first resource set, the second resource set, and the third resource set may include associating each of the first resource set, the second resource set, and the third resource set with at least one of: uplink use, downlink use, or a combination thereof. In some examples, the first resource set, the second resource set, and the third resource set may be identified based at least in part on: a wired communication link, a wireless communication link, or a combination thereof.

In some examples, the operation(s) at block 1710 may include defining a first LBT procedure to be performed by devices associated with a first operator before accessing the third resource set, and defining a second LBT procedure to be performed by devices associated with a second operator before accessing the third resource set. The first LBT procedure and the second LBT procedure may provide different contention for access thresholds.

The operation(s) at block 1710 may be performed using the wireless communication manager 1020 or 1120 as described with reference to FIG. 10 or 11, the UE wireless communication manager 1250 described with reference to FIG. 12, the base station wireless communication manager 1360 as described with reference to FIG. 13, or the resource set identifier 1035 or 1135 as described with reference to FIG. 10 or 11. LBT procedures may be defined using the wireless communication manager 1020 or 1120 as described with reference to FIG. 10 or 11, the UE wireless communication manager 1250 described with reference to FIG. 12, the base station wireless communication manager 1360 as described with reference to FIG. 13, or the LBT procedure definer 1145 as described with reference to FIG. 11.

At block 1715, the method 1700 may include transmitting an indication of at least one resource set of the first resource set, the second resource set, or the third resource set to a second device. The operation(s) at block 1715 may be performed using the wireless communication manager 1020 or 1120 as described with reference to FIG. 10 or 11, the UE wireless communication manager 1250 described with reference to FIG. 12, the base station wireless communication manager 1360 as described with reference to FIG. 13, or the resource set indicator 1040 or 1140 as described with reference to FIG. 10 or 11.

At block 1720, the method 1700 may include operating at least one aspect of the first resource set and the third resource set jointly, or alternatively, separately. In some examples, the at least one jointly or separately operated aspect of the first resource set and the third resource set may include: a HARQ process, a power control parameter, or a combination thereof. The operation(s) at block 1720 may be performed using the wireless communication manager 1020 or 1120 as described with reference to FIG. 10 or 11, the UE wireless communication manager 1250 described with reference to FIG. 12, the base station wireless communication manager 1360 as described with reference to FIG. 13, or the resource manager 1150 as described with reference to FIG. 11.

In some examples, the method 1700 may include defining a first partition of resources for the first resource set, the second resource set, and the third resource set at a first time instance, and defining a second partition of resources for the first resource set, the second resource set, and the third resource set at a second time instance.

In some examples, aspects of the methods 1600 and 1700 as described with reference to FIGS. 16 and 17 may be combined. In some examples, aspects from two or more of the methods 1400, 1500, 1600, or 1700 described with reference to FIG. 14, 15, 16, or 17 may be combined. It should be noted that the methods 1400, 1500, 1600, and 1700 are just examples, and that the operations of the methods 1400, 1500, 1600, or 1700 may be rearranged or otherwise modified such that other examples are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication, comprising:
identifying, by a first device, a first resource set, a second resource set, and a third resource set in a radio frequency spectrum band, wherein the first resource set, the second resource set, and the third resource set are respectively associated with a first restriction level for resource usage, a second restriction level for resource usage, and a third restriction level for resource usage, wherein the first restriction level for resource usage and the second restriction level for resource usage are associated with different LBT procedures; and
communicating with a second device using at least one resource set of the first resource set, the second resource set, or the third resource set, the at least one resource set based at least in part on the first restriction level for resource usage, the second restriction level for resource usage, or the third restriction level for resource usage.

2. The method of claim 1, wherein the radio frequency spectrum band is shared by devices associated with a first operator and devices associated with a second operator.

3. The method of claim 1, wherein the first restriction level for resource usage comprises an exclusive resource usage by a first set of devices including the first device, the second restriction level for resource usage comprises a prohibition of resource usage by at least the first device, and the third restriction level for resource usage comprises a contention-based resource usage by a second set of devices including the first device.

4. The method of claim 3, wherein the contention-based resource usage by the second set of devices comprises one or more thresholds for determining whether resources in the third resource set are cleared for usage by the second set of devices.

5. The method of claim 3, wherein the first device is associated with a first operator, and the second restriction level for resources usage comprises a prohibition of resource usage by devices associated with the first operator and an exclusive resource usage by devices associated with a second operator.

6. The method of claim 1, further comprising:
selecting the at least one resource set for communicating with the second device from the first resource set, the second resource set, or the third resource set.

7. The method of claim 6, wherein the at least one resource set for communicating with the second device is selected based at least in part on:
an operator associated with the first device, a characteristic of the communication, or a combination thereof.

8. The method of claim 7, wherein the characteristic of the communication is based at least in part on:
the communication being associated with a quality of service (QoS) satisfying a threshold QoS, the communication comprising a type of control communication, the communication comprising a type of signaling, the communication comprising a type of synchronization signal, the communication being a broadcast communication type, the communication being associated with time tracking, the communication being associated with frequency tracking, the communication being associated with measurement or discovery of cells, or a combination thereof.

9. The method of claim 1, wherein each of the first resource set, the second resource set, and the third resource set is associated with at least one of:
uplink use, downlink use, or a combination thereof.

10. The method of claim 1, further comprising:
receiving an indication of resources associated with at least one of: the first resource set, the second resource set, the third resource set, or a combination thereof.

11. The method of claim 1, further comprising:
identifying a first LBT procedure to be performed by devices associated with a first operator before accessing the third resource set; and
identifying a second LBT procedure to be performed by devices associated with a second operator before accessing the third resource set,
wherein the first LBT procedure and the second LBT procedure provide different contention for access thresholds.

12. The method of claim 1, wherein the first resource set, the second resource set, and the third resource set are identified based at least in part on:
TDM, FDM, SDM, or a combination thereof.

13. The method of claim 1, further comprising:
determining a first partition of resources for the first resource set, the second resource set, and the third resource set at a first time instance; and
determining a second partition of resources for the first resource set, the second resource set, and the third resource set at a second time instance.

14. The method of claim 1, wherein the first resource set, the second resource set, and the third resource set are identified based at least in part on:
a wired communication link, a wireless communication link, or a combination thereof.

15. The method of claim 1, further comprising:
operating at least one aspect of the first resource set and the third resource set jointly.

16. The method of claim 15, wherein the at least one jointly operated aspect of the first resource set and the third resource set comprises:
a hybrid automatic repeat request (HARD) process, a power control parameter, or a combination thereof.

17. The method of claim 1, further comprising:
operating at least one aspect of the first resource set and the third resource set separately.

18. The method of claim 17, wherein the at least one separately operated aspect of the first resource set and the third resource set comprises a hybrid automatic repeat request (HARQ) process, a power control parameter, or a combination thereof.

19. An apparatus for wireless communication, comprising:
means for identifying, by a first device, a first resource set, a second resource set, and a third resource set in a radio frequency spectrum band, wherein the first resource set, the second resource set, and the third resource set are respectively associated with a first restriction level for resource usage, a second restriction level for resource usage, and a third restriction level for resource usage, wherein the first restriction level for resource usage and the second restriction level for resource usage are associated with different LBT procedures; and
means for communicating with a second device using at least one resource set of the first resource set, the second resource set, or the third resource set, the at least one resource set based at least in part on the first restriction level for resource usage, the second restriction level for resource usage, or the third restriction level for resource usage.

20. The apparatus of claim 19, wherein the radio frequency spectrum band is shared by devices associated with a first operator and devices associated with a second operator.

21. The apparatus of claim 19, wherein the first restriction level for resource usage comprises an exclusive resource usage by a first set of devices including the first device, the second restriction level for resource usage comprises a prohibition of resource usage by at least the first device, and the third restriction level for resource usage comprises a contention-based resource usage by a second set of devices including the first device.

22. The apparatus of claim 21, wherein the contention-based resource usage by the second set of devices comprises one or more thresholds for determining whether resources in the third resource set are cleared for usage by the second set of devices.

23. The apparatus of claim 21, wherein the first device is associated with a first operator, and the second restriction level for resources usage comprises a prohibition of resource usage by devices associated with the first operator and an exclusive resource usage by devices associated with a second operator.

24. The apparatus of claim 19, further comprising:
means for selecting the at least one resource set for communicating with the second device from the first resource set, the second resource set, or the third resource set.

25. The apparatus of claim 24, wherein the at least one resource set for communicating with the second device is selected based at least in part on:
an operator associated with the first device, a characteristic of the communication, or a combination thereof.

26. The apparatus of claim 25, wherein the characteristic of the communication is based at least in part on:
the communication being associated with a quality of service (QoS) satisfying a threshold QoS, the communication comprising a type of control communication, the communication comprising a type of signaling, the communication comprising a type of synchronization signal, the communication being a broadcast communication type, the communication being associated with time tracking, the communication being associated with frequency tracking, the communication being associated with measurement or discovery of cells, or a combination thereof.

27. The apparatus of claim 19, wherein each of the first resource set, the second resource set, and the third resource set is associated with at least one of:
uplink use, downlink use, or a combination thereof.

28. The apparatus of claim 19, further comprising:
means for receiving an indication of resources associated with at least one of: the first resource set, the second resource set, the third resource set, or a combination thereof.

29. The apparatus of claim 19, further comprising:
means for identifying a first LBT procedure to be performed by devices associated with a first operator before accessing the third resource set; and
means for identifying a second LBT procedure to be performed by devices associated with a second operator before accessing the third resource set, wherein the first LBT procedure and the second LBT procedure provide different contention for access thresholds.

30. The apparatus of claim 19, wherein the first resource set, the second resource set, and the third resource set are identified based at least in part on:
TDM, FDM, SDM, or a combination thereof.

31. The apparatus of claim 19, further comprising:
means for determining a first partition of resources for the first resource set, the second resource set, and the third resource set at a first time instance; and
means for determining a second partition of resources for the first resource set, the second resource set, and the third resource set at a second time instance.

32. The apparatus of claim 19, wherein the first resource set, the second resource set, and the third resource set are identified based at least in part on:
a wired communication link, a wireless communication link, or a combination thereof.

33. The apparatus of claim 19, further comprising:
means for operating at least one aspect of the first resource set and the third resource set jointly.

34. The apparatus of claim 33, wherein the at least one jointly operated aspect of the first resource set and the third resource set comprises:
a hybrid automatic repeat request (HARD) process, a power control parameter, or a combination thereof.

35. The apparatus of claim 19, further comprising:
means for operating at least one aspect of the first resource set and the third resource set separately.

36. The apparatus of claim 35, wherein the at least one separately operated aspect of the first resource set and the third resource set comprises a hybrid automatic repeat request (HARQ) process, a power control parameter, or a combination thereof.

37. An apparatus for wireless communication, comprising:
a processor;
memory in electronic communication with the processor; and
instructions stored in the memory, wherein the instructions are executable by the processor to:
identify, at a first device, a first resource set, a second resource set, and a third resource set in a radio frequency spectrum band, wherein the first resource set, the second resource set, and the third resource set are respectively associated with a first restriction level for resource usage, a second restriction level for resource usage, and a third restriction level for resource usage, wherein the first restriction level for resource usage and the second restriction level for resource usage are associated with different LBT procedures; and
communicate with a second device using at least one resource set of the first resource set, the second resource set, or the third resource set, the at least one resource set based at least in part on the first restriction level for resource usage, the second restriction level for resource usage, or the third restriction level for resource usage.

38. The apparatus of claim 37, wherein the radio frequency spectrum band is shared by devices associated with a first operator and devices associated with a second operator.

39. The apparatus of claim 37, wherein the first restriction level for resource usage comprises an exclusive resource usage by a first set of devices including the first device, the second restriction level for resource usage comprises a prohibition of resource usage by at least the first device, and the third restriction level for resource usage comprises a contention-based resource usage by a second set of devices including the first device.

40. The apparatus of claim 39, wherein the contention-based resource usage by the second set of devices comprises one or more thresholds for determining whether resources in the third resource set are cleared for usage by the second set of devices.

41. The apparatus of claim 39, wherein the first device is associated with a first operator, and the second restriction level for resources usage comprises a prohibition of resource usage by devices associated with the first operator and an exclusive resource usage by devices associated with a second operator.

42. The apparatus of claim 37, wherein the instructions are executable by the processor to:
select the at least one resource set for communicating with the second device from the first resource set, the second resource set, or the third resource set.

43. The apparatus of claim 42, wherein the at least one resource set for communicating with the second device is selected based at least in part on:
an operator associated with the first device, a characteristic of the communication, or a combination thereof.

44. The apparatus of claim 37, wherein each of the first resource set, the second resource set, and the third resource set is associated with at least one of:
uplink use, downlink use, or a combination thereof.

45. The apparatus of claim 37, wherein the instructions are executable by the processor to:
receive an indication of resources associated with at least one of: the first resource set, the second resource set, the third resource set, or a combination thereof.

46. The apparatus of claim 37, wherein the first resource set, the second resource set, and the third resource set are identified based at least in part on:
TDM, FDM, SDM, or a combination thereof.

47. The apparatus of claim 37, wherein the instructions are executable by the processor to:
operate at least one aspect of the first resource set and the third resource set separately.

48. A non-transitory computer-readable medium storing code for wireless communication, the code comprising instructions executable to:
identify, at a first device, a first resource set, a second resource set, and a third resource set in a radio frequency spectrum band, wherein the first resource set, the second resource set, and the third resource set are respectively associated with a first restriction level for resource usage, a second restriction level for resource usage, and a third restriction level for resource usage, wherein the first restriction level for resource usage and the second restriction level for resource usage are associated with different LBT procedures; and
communicate with a second device using at least one resource set of the first resource set, the second resource set, or the third resource set, the at least one resource set based at least in part on the first restriction level for resource usage, the second restriction level for resource usage, or the third restriction level for resource usage.

49. The computer-readable medium of claim 48, wherein the radio frequency spectrum band is shared by devices associated with a first operator and devices associated with a second operator.

50. The computer-readable medium of claim 48, wherein the first restriction level for resource usage comprises an exclusive resource usage by a first set of devices including the first device, the second restriction level for resource usage comprises a prohibition of resource usage by at least the first device, and the third restriction level for resource usage comprises a contention-based resource usage by a second set of devices including the first device.

51. The computer-readable medium of claim 48, wherein each of the first resource set, the second resource set, and the third resource set is associated with at least one of:
uplink use, downlink use, or a combination thereof.

52. The computer-readable medium of claim 48, wherein the first resource set, the second resource set, and the third resource set are identified based at least in part on:
TDM, FDM, SDM, or a combination thereof.

53. A method for wireless communication, comprising:
identifying, by a first device, a first resource set, a second resource set, and a third resource set in a radio frequency spectrum band, wherein the first resource set, the second resource set, and the third resource set are respectively associated with a first restriction level for resource usage, a second restriction level for resource usage, and a third restriction level for resource usage, wherein the first restriction level for resource usage and the second restriction level for resource usage are associated with different LBT procedures; and
transmitting an indication of at least one resource set of the first resource set, the second resource set, or the third resource set to a second device.

54. The method of claim 53, wherein the radio frequency spectrum band is shared by devices associated with a first operator and devices associated with a second operator.

55. The method of claim 53, wherein the first restriction level for resource usage comprises an exclusive resource usage by a first set of devices including the first device, the second restriction level for resource usage comprises a prohibition of resource usage by at least the first device, and the third restriction level for resource usage comprises a contention-based resource usage by a second set of devices including the first device.

56. The method of claim 55, wherein the contention-based resource usage by the second set of devices comprises one or more thresholds for determining whether resources in the third resource set are cleared for usage by the second set of devices.

57. The method of claim 55, wherein the first device is associated with a first operator, and the second restriction level for resources usage comprises a prohibition of resource usage by devices associated with the first operator and an exclusive resource usage by devices associated with a second operator.

58. The method of claim 53, wherein identifying the first resource set, the second resource set, and the third resource set comprises:
associating each of the first resource set, the second resource set, and the third resource set with at least one of: uplink use, downlink use, or a combination thereof.

59. The method of claim 53, further comprising:
defining a first LBT procedure to be performed by devices associated with a first operator before accessing the third resource set; and
defining a second LBT procedure to be performed by devices associated with a second operator before accessing the third resource set, wherein the first LBT procedure and the second LBT procedure provide different contention for access thresholds.

60. The method of claim 53, wherein identifying the first resource set, the second resource set, and the third resource set comprises:
defining the first resource set, the second resource set, and the third resource set based at least in part on: TDM, FDM, SDM, or a combination thereof.

61. The method of claim 53, further comprising:
defining a first partition of resources for the first resource set, the second resource set, and the third resource set at a first time instance; and
defining a second partition of resources for the first resource set, the second resource set, and the third resource set at a second time instance.

62. The method of claim 53, wherein the first resource set, the second resource set, and the third resource set are identified based at least in part on:
a wired communication link, a wireless communication link, or a combination thereof.

63. The method of claim 53, further comprising:
operating at least one aspect of the first resource set and the third resource set jointly.

64. The method of claim 63, wherein the at least one jointly operated aspect of the first resource set and the third resource set comprises:
a hybrid automatic repeat request (HARQ) process, a power control parameter, or a combination thereof.

65. The method of claim 53, further comprising:
operating at least one aspect of the first resource set and the third resource set separately.

66. The method of claim 65, wherein the at least one separately operated aspect of the first resource set and the third resource set comprises a hybrid automatic repeat request (HARQ) process, a power control parameter, or a combination thereof.

67. An apparatus for wireless communication, comprising:
means for identifying, by a first device, a first resource set, a second resource set, and a third resource set in a radio frequency spectrum band, wherein the first resource set, the second resource set, and the third resource set are respectively associated with a first restriction level for resource usage, a second restriction level for resource usage, and a third restriction level for resource usage, wherein the first restriction level for resource usage and the second restriction level for resource usage are associated with different LBT procedures; and
means for transmitting an indication of at least one resource set of the first resource set, the second resource set, or the third resource set to a second device.

68. The apparatus of claim 67, wherein the radio frequency spectrum band is shared by devices associated with a first operator and devices associated with a second operator.

69. The apparatus of claim 67, wherein the first restriction level for resource usage comprises an exclusive resource usage by a first set of devices including the first device, the second restriction level for resource usage comprises a prohibition of resource usage by at least the first device, and the third restriction level for resource usage comprises a contention-based resource usage by a second set of devices including the first device.

70. The apparatus of claim 69, wherein the contention-based resource usage by the second set of devices comprises one or more thresholds for determining whether resources in the third resource set are cleared for usage by the second set of devices.

71. The apparatus of claim 69, wherein the first device is associated with a first operator, and the second restriction level for resources usage comprises a prohibition of resource usage by devices associated with the first operator and an exclusive resource usage by devices associated with a second operator.

72. The apparatus of claim 67, wherein the means for identifying the first resource set, the second resource set, and the third resource set comprises:
means for associating each of the first resource set, the second resource set, and the third resource set with at least one of: uplink use, downlink use, or a combination thereof.

73. The apparatus of claim 67, further comprising:
means for defining a first LBT procedure to be performed by devices associated with a first operator before accessing the third resource set; and
means for defining a second LBT procedure to be performed by devices associated with a second operator before accessing the third resource set,
wherein the first LBT procedure and the second LBT procedure provide different contention for access thresholds.

74. The apparatus of claim 67, wherein the means for identifying the first resource set, the second resource set, and the third resource set comprises:
means for defining the first resource set, the second resource set, and the third resource set based at least in part on: TDM, FDM, SDM, or a combination thereof.

75. The apparatus of claim 67, further comprising:
means for defining a first partition of resources for the first resource set, the second resource set, and the third resource set at a first time instance; and
means for defining a second partition of resources for the first resource set, the second resource set, and the third resource set at a second time instance.

76. The apparatus of claim 67, wherein the first resource set, the second resource set, and the third resource set are identified based at least in part on:
a wired communication link, a wireless communication link, or a combination thereof.

77. The apparatus of claim 67, further comprising:
means for operating at least one aspect of the first resource set and the third resource set jointly.

78. The apparatus of claim 77, wherein the at least one jointly operated aspect of the first resource set and the third resource set comprises:
a hybrid automatic repeat request (HARQ) process, a power control parameter, or a combination thereof.

79. The apparatus of claim 67, further comprising:
means for operating at least one aspect of the first resource set and the third resource set separately.

80. The apparatus of claim 79, wherein the at least one separately operated aspect of the first resource set and the third resource set comprises a hybrid automatic repeat request (HARQ) process, a power control parameter, or a combination thereof.

81. An apparatus for wireless communication, comprising:
a processor;
memory in electronic communication with the processor; and
instructions stored in the memory, wherein the instructions are executable by the processor to:

identify, by a first device, a first resource set, a second resource set, and a third resource set in a radio frequency spectrum band, wherein the first resource set, the second resource set, and the third resource set are respectively associated with a first restriction level for resource usage, a second restriction level for resource usage, and a third restriction level for resource usage, wherein the first restriction level for resource usage and the second restriction level for resource usage are associated with different LBT procedures; and transmit an indication of at least one resource set of the first resource set, the second resource set, or the third resource set to a second device.

82. The apparatus of claim 81, wherein the radio frequency spectrum band is shared by devices associated with a first operator and devices associated with a second operator.

83. The apparatus of claim 81, wherein the first restriction level for resource usage comprises an exclusive resource usage by a first set of devices including the first device, the second restriction level for resource usage comprises a prohibition of resource usage by at least the first device, and the third restriction level for resource usage comprises a contention-based resource usage by a second set of devices including the first device.

84. The apparatus of claim 83, wherein the contention-based resource usage by the second set of devices comprises one or more thresholds for determining whether resources in the third resource set are cleared for usage by the second set of devices.

85. The apparatus of claim 83, wherein the first device is associated with a first operator, and the second restriction level for resources usage comprises a prohibition of resource usage by devices associated with the first operator and an exclusive resource usage by devices associated with a second operator.

86. The apparatus of claim 81, wherein identifying the first resource set, the second resource set, and the third resource set comprises:

associating each of the first resource set, the second resource set, and the third resource set with at least one of: uplink use, downlink use, or a combination thereof.

87. The apparatus of claim 81, wherein identifying the first resource set, the second resource set, and the third resource set comprises:

defining the first resource set, the second resource set, and the third resource set based at least in part on: TDM, FDM, SDM, or a combination thereof.

88. The apparatus of claim 81, wherein the instructions are executable by the processor to:

operate at least one aspect of the first resource set and the third resource set separately.

89. A non-transitory computer-readable medium storing code for wireless communication, the code comprising instructions executable to:

identify, by a first device, a first resource set, a second resource set, and a third resource set in a radio frequency spectrum band, wherein the first resource set, the second resource set, and the third resource set are respectively associated with a first restriction level for resource usage, a second restriction level for resource usage, and a third restriction level for resource usage, wherein the first restriction level for resource usage and the second restriction level for resource usage are associated with different LBT procedures; and transmit an indication of at least one resource set of the first resource set, the second resource set, or the third resource set to a second device.

90. The computer-readable medium of claim 89, wherein the radio frequency spectrum band is shared by devices associated with a first operator and devices associated with a second operator.

91. The computer-readable medium of claim 89, wherein the first restriction level for resource usage comprises an exclusive resource usage by a first set of devices including the first device, the second restriction level for resource usage comprises a prohibition of resource usage by at least the first device, and the third restriction level for resource usage comprises a contention-based resource usage by a second set of devices including the first device.

92. The computer-readable medium of claim 89, wherein identifying the first resource set, the second resource set, and the third resource set comprises:

associating each of the first resource set, the second resource set, and the third resource set with at least one of: uplink use, downlink use, or a combination thereof.

93. The computer-readable medium of claim 89, wherein identifying the first resource set, the second resource set, and the third resource set comprises:

defining the first resource set, the second resource set, and the third resource set based at least in part on: TDM, FDM, SDM, or a combination thereof.

* * * * *